(12) United States Patent
Montag

(10) Patent No.: US 9,781,878 B2
(45) Date of Patent: Oct. 10, 2017

(54) METERING SYSTEM WITH VARIABLE DISCHARGE

(71) Applicant: Montag Investments, LLC, Emmetsburg, IA (US)

(72) Inventor: Roger A. Montag, Malcolm, NE (US)

(73) Assignee: MONTAG INVESTMENTS, LLC, Emmetsburg, IA (US)

( * ) Notice: Subject to any disclaimer, the term of this patent is extended or adjusted under 35 U.S.C. 154(b) by 7 days.

(21) Appl. No.: 14/600,638

(22) Filed: Jan. 20, 2015

(65) Prior Publication Data
US 2016/0207017 A1    Jul. 21, 2016

(51) Int. Cl.
| | | |
|---|---|---|
| *B65G 53/40* | (2006.01) | |
| *A01C 15/00* | (2006.01) | |
| *A01C 7/08* | (2006.01) | |
| *A01C 7/16* | (2006.01) | |
| *A01C 15/04* | (2006.01) | |
| *G01F 13/00* | (2006.01) | |
| *A01C 7/06* | (2006.01) | |

(52) U.S. Cl.
CPC .......... *A01C 15/006* (2013.01); *A01C 7/082* (2013.01); *A01C 7/16* (2013.01); *A01C 15/04* (2013.01); *G01F 13/005* (2013.01); *A01C 7/06* (2013.01)

(58) Field of Classification Search
CPC ....... B01F 15/0216; B01F 3/18; A01C 15/006
USPC ................................. 406/117, 120
See application file for complete search history.

(56) References Cited

U.S. PATENT DOCUMENTS

| | | | |
|---|---|---|---|
| 3,373,973 A | 3/1968 | Schmidt-Holthausen | |
| 3,710,983 A | 1/1973 | Ricciardi | |
| 4,087,079 A | 5/1978 | Kramer | |
| 4,296,695 A * | 10/1981 | Quanbeck | A01C 15/04 111/136 |
| 4,561,781 A | 12/1985 | Seymour | |

(Continued)

FOREIGN PATENT DOCUMENTS

| | | |
|---|---|---|
| CN | 101828099 A | 9/2010 |
| CN | 202497837 U | 10/2012 |

(Continued)

OTHER PUBLICATIONS

"International Application No. PCT/US2015/012021 International Search Report and Written Opinion", May 5, 2015, 18 pages.

*Primary Examiner* — William R Harp
(74) *Attorney, Agent, or Firm* — Goodhue, Coleman & Owens, P.C.

(57) ABSTRACT

An improved particulate metering system is provided with variable blend, application rate, and section control. The system includes a plurality of particulate mixing areas, each having an air input and a plurality of particulate inputs. A plurality of particulate sources is provided, each being in communication with a particulate input of a particulate mixing area. A separate type of particulate can be in each of the plurality of particulate sources. The system includes a plurality of operated conveyances, each being in communication with a particulate source and a particulate input. Each of the plurality of particulate mixing areas can receive air from the air input and a separate type of particulate, and can discharge an air-particulate mixture. One or more metering controls operably control one or more of the operated conveyances.

17 Claims, 20 Drawing Sheets

(56) References Cited

U.S. PATENT DOCUMENTS

| | | | |
|---|---|---|---|
| 4,779,765 A * | 10/1988 | Neumeyer | A01C 7/06 111/174 |
| 4,793,743 A * | 12/1988 | Grodecki | A01C 7/081 406/123 |
| 4,793,744 A | 12/1988 | Montag | |
| 4,834,004 A | 5/1989 | Butuk et al. | |
| 4,900,157 A | 2/1990 | Stegemoeller et al. | |
| 5,299,888 A | 4/1994 | Wysong et al. | |
| 5,592,889 A | 1/1997 | Bourgault | |
| 5,775,585 A | 7/1998 | Duello | |
| 7,140,310 B2 * | 11/2006 | Mayerle | A01C 7/06 111/175 |
| 7,344,298 B2 | 3/2008 | Wilmer et al. | |
| 7,380,733 B2 * | 6/2008 | Owenby | A01C 7/122 239/656 |
| 7,413,388 B2 * | 8/2008 | Krebs | B65G 53/08 406/120 |
| 7,854,066 B2 | 12/2010 | Wendte | |
| 8,336,469 B2 | 12/2012 | Preheim et al. | |
| 8,504,310 B2 * | 8/2013 | Landphair | A01C 7/081 702/45 |
| 8,616,761 B2 | 12/2013 | McLaughlin et al. | |
| 2016/0120100 A1 * | 5/2016 | Thompson | A01C 15/006 406/120 |

FOREIGN PATENT DOCUMENTS

| | | |
|---|---|---|
| CN | 104923097 A | 9/2015 |
| CN | 103349930 B | 1/2016 |

* cited by examiner

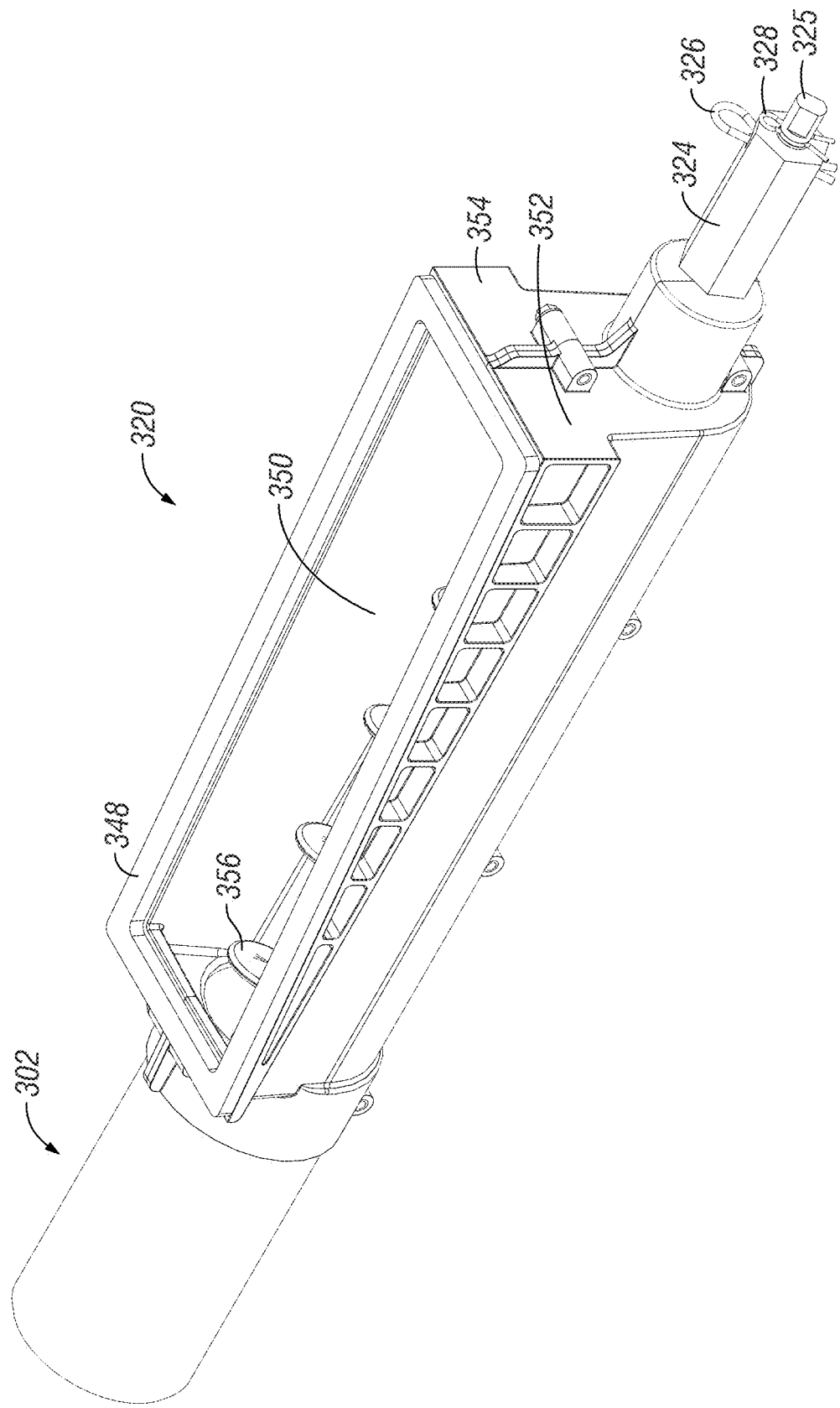

METERING SYSTEM WITH VARIABLE DISCHARGE

BACKGROUND

I. Field of the Disclosure

A metering system for solid particulate is disclosed. More specifically, but not exclusively, a metering system with variable blend and variable application rate controls for particulate matter, such as dry fertilizers, is disclosed.

II. Description of the Prior Art

Particulate metering systems use varied approaches to control the rate at which particulate is metered and/or blended with other particulate types. Particulate metering is complicated by the desire to simultaneously meter at separate discharge points varying rates and blends of different particulate. In such instances where the particulate is fertilizer, there's a significant interest in controlling the blend and application rate of two or more fertilizers, and specifically controlling a variation in the blend and application rate of two or more fertilizers at separate discharge points, such as at separate rows in a field. Further complications surround the growing desire to independently control variations in both the blend and application rate of particulate for each separate discharge point or for a set of discharge points. Many desire to control the blend and application rate of two or more fertilizers independently at each row unit. In other words, what is desired in at least one application is a dry fertilizer metering system that can make adjustments to both the application rate and blend of two or more fertilizers on a row-by-row basis—one row receiving a blend of fertilizers at a desired rate while another row simultaneously receives the same or a separate blend of fertilizers at the same or another desired rate.

SUMMARY

The present disclosure provides a particulate metering system with variable blend and variable application rate controls for separate discharges or a group of discharges.

A particulate metering system with variable discharge control and a flow path is provided. The flow path can include an inlet in communication with one or more intake points and an outlet in communication with one or more discharge points. The system also can include a plurality of particulate storage areas. Each of the plurality of storage areas has different types of particulate. A plurality of separate mixing areas within the flow path is provided. Each of the plurality of separate particulate mixing areas can have a mixture ratio of the different types of particulate. One or more metering controls can be in operable control of metering the different types of particulate into the plurality of separate particulate mixing areas for controlling a variation of the mixture ratio. The mixture ratio can be equally or unequally distributed across the one or more discharge points of the flow path.

The system can include a plurality of operated conveyances in communication with one of the particulate mixing areas. Each of the operated conveyances is in communication with one of the particulate storage areas and conveys one of the different types of particulate to the one of the particulate mixing areas. Two or more of the operated conveyances can operate at a different rate.

Each of the particulate mixing areas can receive the different types of particulate from the separate particulate storage areas. Further, each of the particulate mixing areas can be in communication with one of the one or more intake points and one of the one or more discharge points. Still further, each of the separate particulate mixing areas can be associated with more than one of the operated conveyances.

The system further includes a first set of operated conveyances and a second set of operated conveyances. A conveyance rate of the first set and a conveyance rate of the second set of the operated conveyances are in communication with the same one of the plurality of particulate storage areas. The conveyance rate of the first set of operated conveyances and the conveyance rate of the second set of operated conveyances can be selectively controllable.

According to another aspect of the disclosure, the particulate metering system includes a plurality of particulate mixing areas. Each of the particulate mixing areas has an air input and a plurality of particulate inputs. A plurality of particulate sources is provided. Each of the particulate sources can be in communication with one of the particulate inputs of each of the particulate mixing areas. A separate type of particulate can be in each of the particulate sources. The system can include a plurality of operated conveyances. Each of the operated conveyances can be in communication with at least one of the particulate sources and one of the particulate inputs. Each of the particulate mixing areas receives air from the air input, receives a separate type of particulate, and discharges an air-particulate mixture.

The system can further include a first subset of the plurality of particulate mixing areas. A first particulate blend is distributed across the first subset of the plurality of particulate mixing areas. A second subset of the plurality of particulate mixing areas is provided. A second particulate blend is distributed across the second subset of the plurality of particulate mixing areas. The first particulate blend and the second particulate blend can contain different metered proportions of particulate.

One or more metering controls can be in operable control of the operated conveyances. The one or more metering controls control the particulate blend within each of particulate mixing areas.

According to yet another aspect of the disclosure, a method for metering particulate with variable control is provided. The method includes providing a plurality of types of particulate, a plurality of particulate sources, a plurality of particulate mixing areas, and a plurality of operated conveyances associated with each of the plurality of particulate mixing areas. Each of the types of particulate is conveyed from the particulate sources to the operated conveyances. Each of the types of particulate is guided from the operated conveyances to the particulate mixing areas. The method can include controlling a particulate blend of the types of particulate across each of the particulate mixing areas. A flow of air is provided through an inlet on each the mixing areas. The particulate blend is discharged through an outlet on each the mixing areas.

The method further includes independently controlling a conveyance rate of each of the operated conveyances associated with each of the particulate mixing areas.

BRIEF DESCRIPTION OF THE DRAWINGS

Illustrated embodiments of the disclosure are described in detail below with reference to the attached drawing figures, which are incorporated by reference herein, and where:

FIG. 10A is an isometric view of a cartridge in accordance with an illustrative embodiment;

DETAILED DESCRIPTION

Figure 1:
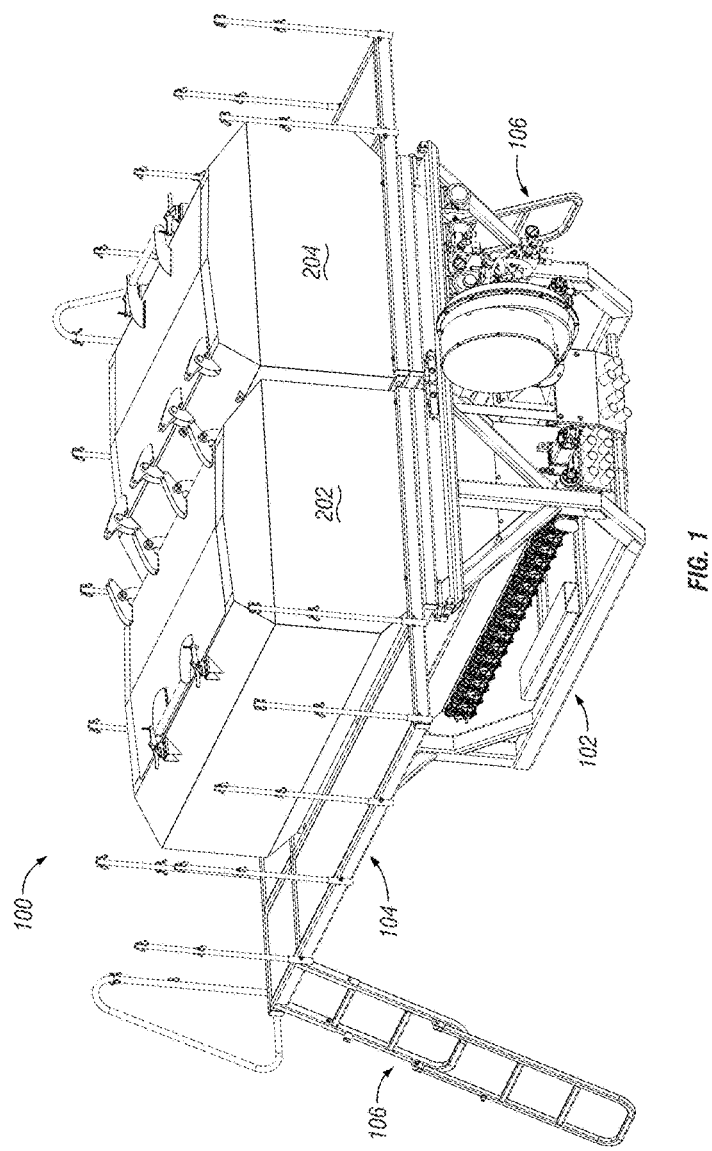
FIG. 1 is a front perspective view of a particulate metering implement in accordance with an illustrative embodiment.

FIG. 1 shows a particulate metering implement 100. While the figure shows a particulate metering implement, it should be appreciated by those skilled in the art that the disclosure covers other types of implements, including but not limited to, seed meters, seed planters, nutrient applicators, and other agricultural equipment. The implement 100 can be mounted upon a towable trailer or other suitable structure such as a toolbar, or integrally formed with a particulate application system. The implement can include a frame assembly 102, upon which particulate containers 202 and 204 can be mounted. For user accessibility to the particulate containers 202 and 204, a platform 104 and ladders 106 can be provided.

Figure 2:
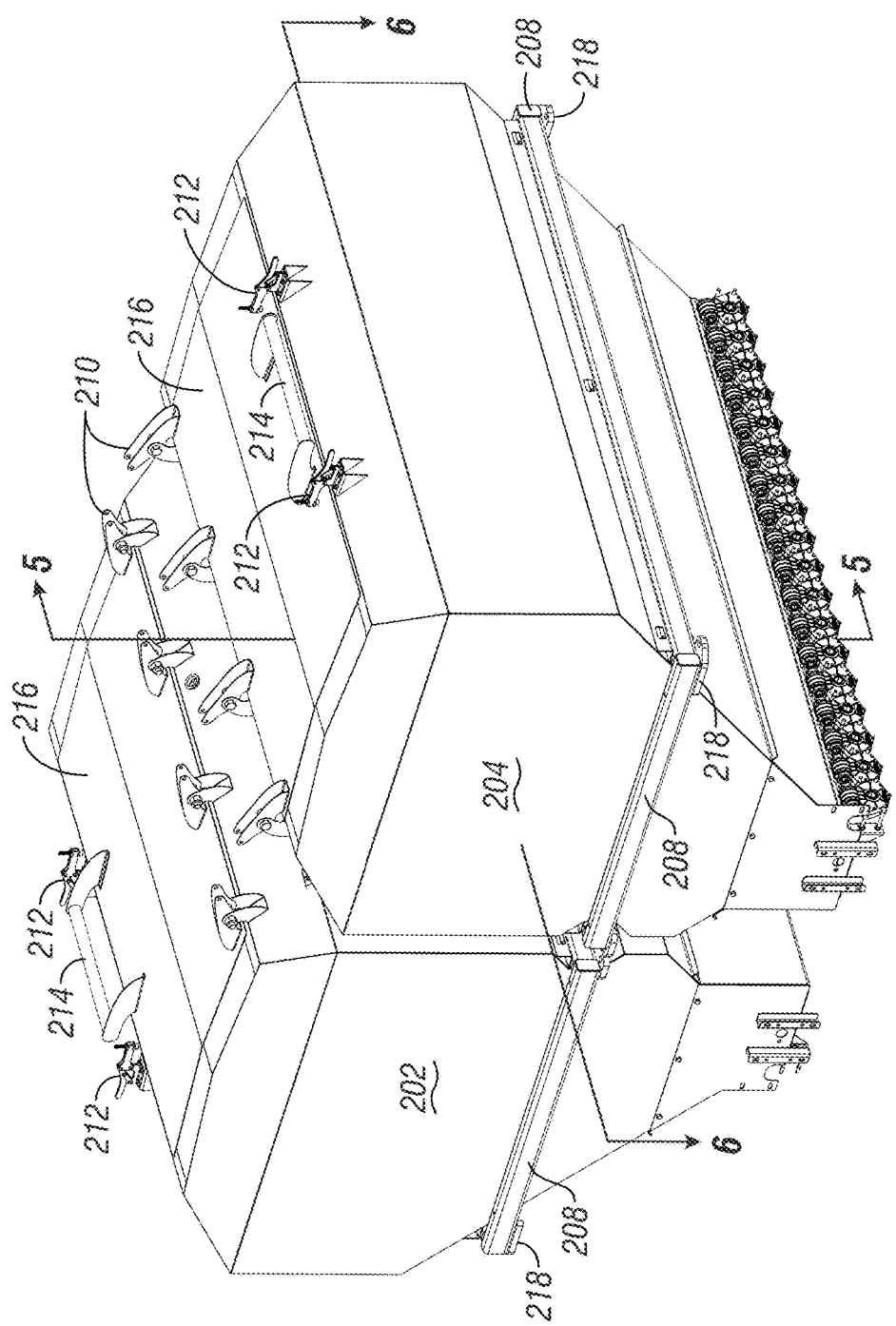
FIG. 2 is a front perspective view of a particulate container system in accordance with an illustrative embodiment.
Figure 3:
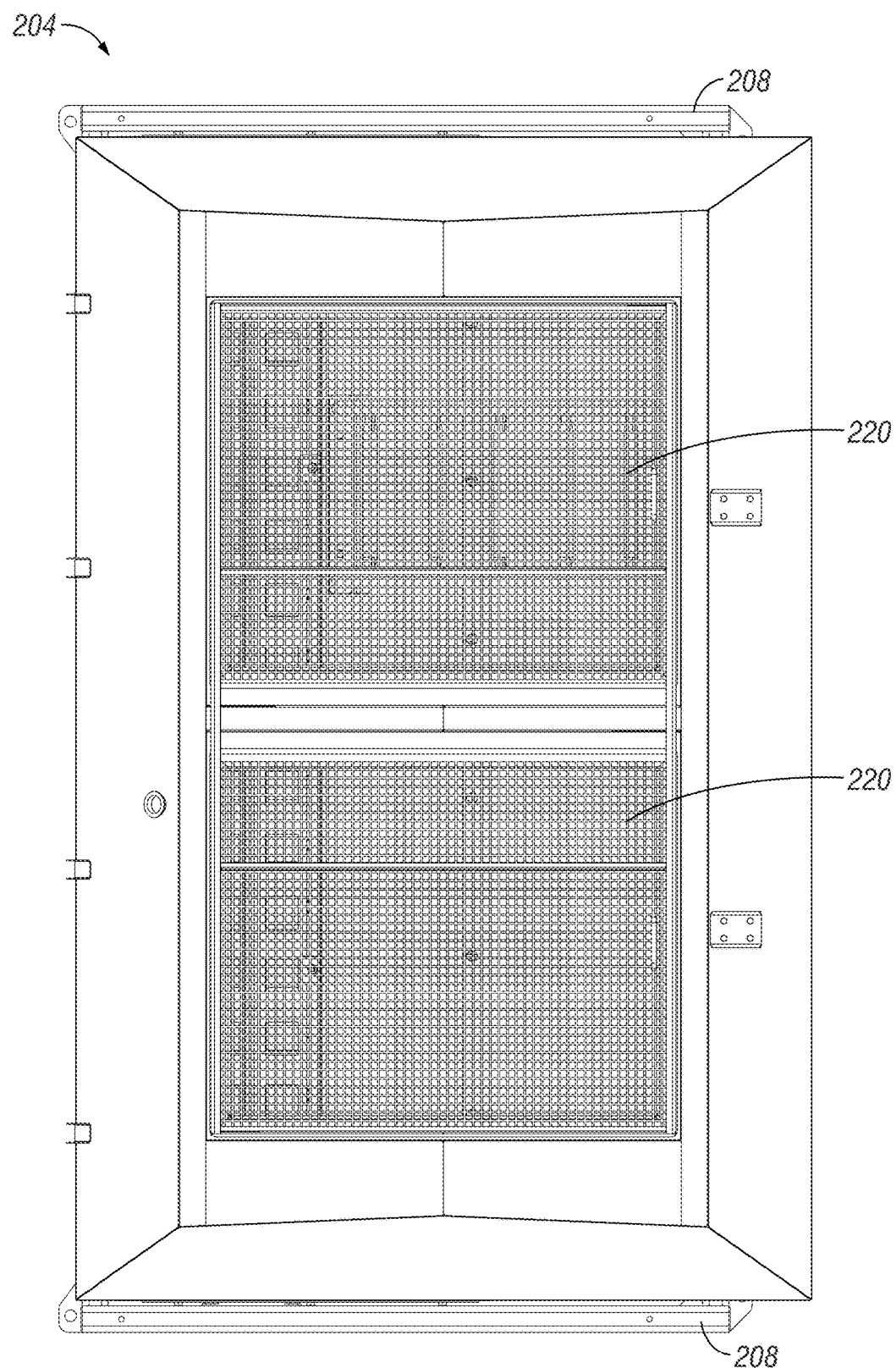
FIG. 3 is a top plan view of a particulate container in accordance with an illustrative embodiment.

The particulate containers 202 and 204 can be connected to the frame assembly 102 by frame members 208 having attachment means 218. Referring to FIG. 2, a top surface of the particulate containers 202 and 204 can include openings (not shown) covered by one or more lids 216. The lids 216 can be opened or removed to permit loading of particulate into and/or servicing the particulate containers 202 and 204. In an exemplary embodiment, an edge of the lids 216 can be pivotally connected to the particulate containers 202 and 204 with one or more hinges 210. One or more clamps 212 can be mounted on the particulate containers 202 and 204 proximate the opposing edge of the lids 216 to releasably secure the lids to the containers. To assist in opening the lids 216, a handle 214 can be connected to the lids 216 proximate to the clamps 212. Upon opening and/or removal of the lids 216, one or more screens 220 can be disposed within the openings of the particulate containers 202 and 204, as shown in FIG. 3, to prevent debris from entering the same.

Further, the clamps 212 can provide an airtight seal between the lids 216 and the particulate containers 202 and 204. In such an embodiment, the airtight seal can permit the particulate containers 202 and 204 to be pressurized. In one representative example, the particulate containers 202 and 204 can be pressurized to ten, fifteen, twenty or greater inches of water (inH$_2$0). The pressurization can assist in guiding the particulate to the particulate handling system 300 (FIG. 5), provide for improved control of quantities dispensed to the particulate handling system 300, and/or provide for improved control of the environment in which the particulate is housed.

In an embodiment, the particulate containers 202 and 204 can be symmetrical in structure and identical in function. In other embodiments, the one or more of the particulate containers can be modified without deviating from the objects of the disclosure. Hereinafter, discussion of particulate container 204 refers to particulate container 204 and its counterpart structure particulate container 202.

Figure 4:
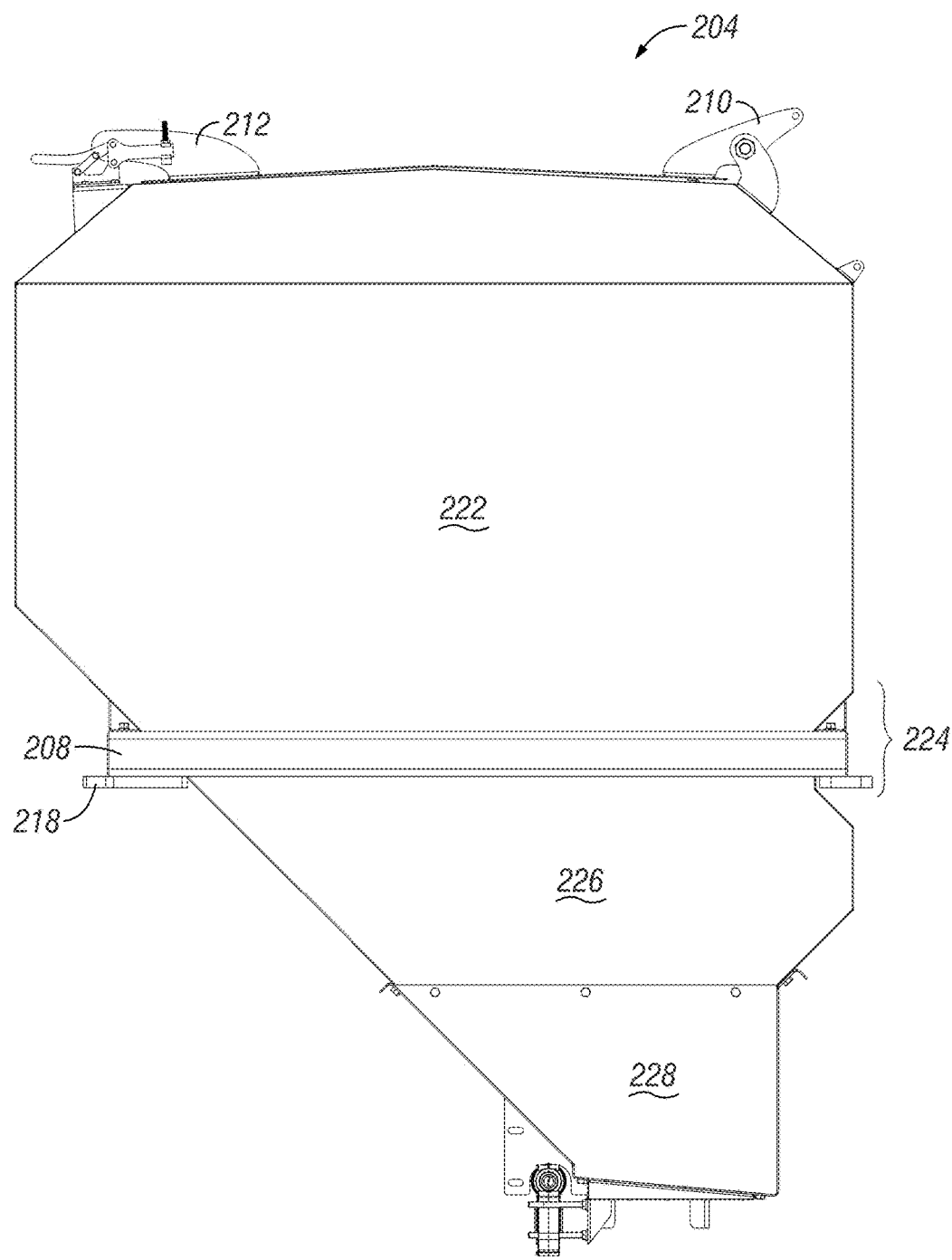
FIG. 4 is a side elevation view a particulate container in accordance with an illustrative embodiment.
Figure 5:
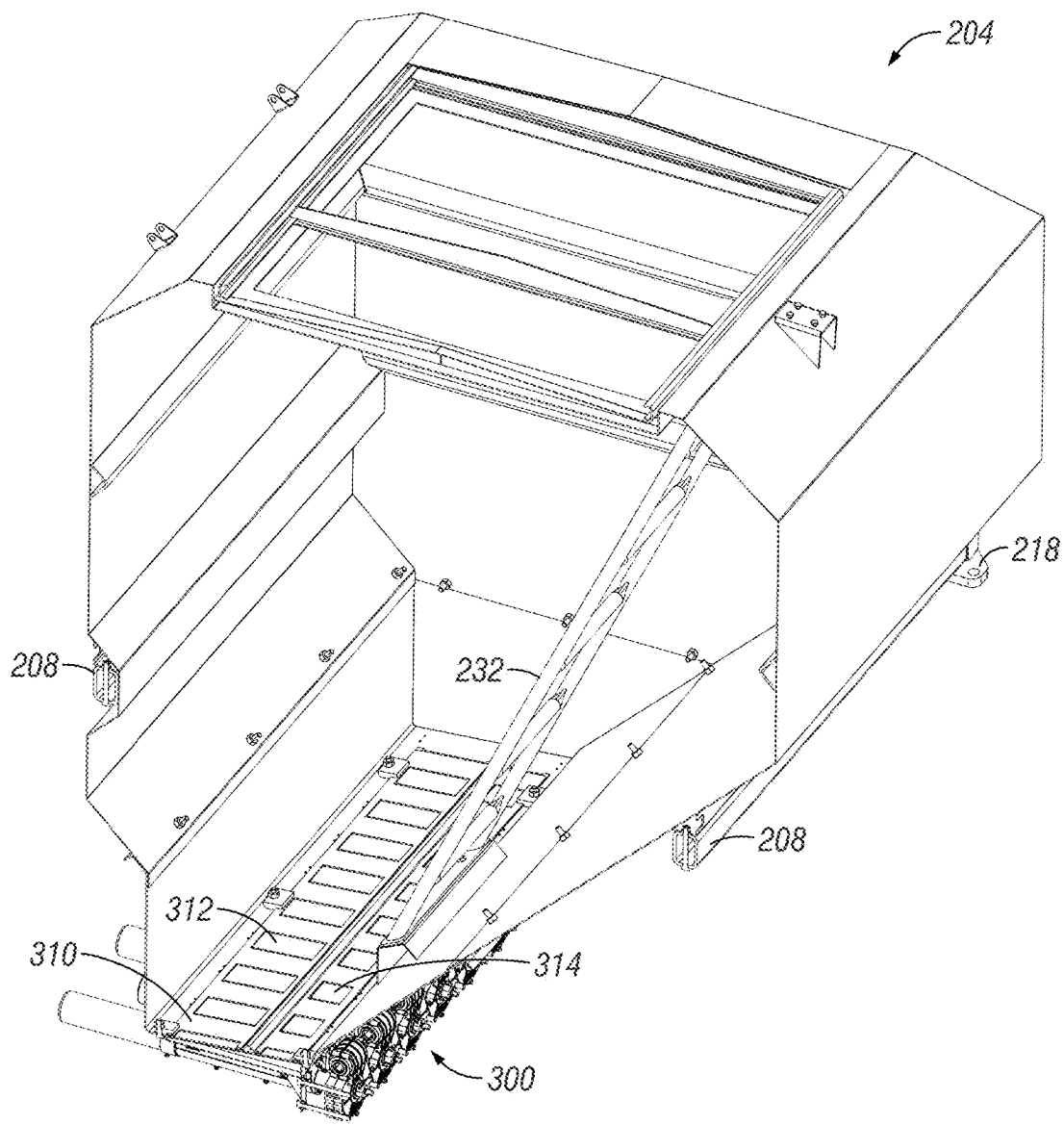
FIG. 5 is a cross-sectional view of the particulate container of FIG. 2 taken along section line 5-5.

Referring to FIGS. 4 and 5, particulate container 204 can include an upper portion 222, a middle portion 226, and a lower portion 228. The upper portion 222 can be a rectangular prism or like shapes to maximize storage capacity above the frame assembly 102 (FIG. 1). The middle portion 226 can be a trapezium prism or like shapes to assist in funneling the particulate to the lower portion 228. The transition from the upper portion 222 to the middle portion 226 can be generally demarcated by frame members 208 disposed around the perimeter of the middle portion 226 of the particulate container 204. The particulate container 204 can also have a recessed area 224 on the side wall proximate to opposing particulate container 202. The recessed area 224 prevents frame member 208 from extending past the plane of the side wall, which maximizes the volume of the particulate container 204 while also minimizing the space required between the two particulate containers 202 and 204. The lower portion 228 can also be a trapezium prism or like shapes to assist in funneling the particulate to the base of the particulate container 204. Further, to assist in servicing the inside of the particulate container 204, a ladder 232 can be provided.

Figure 6:
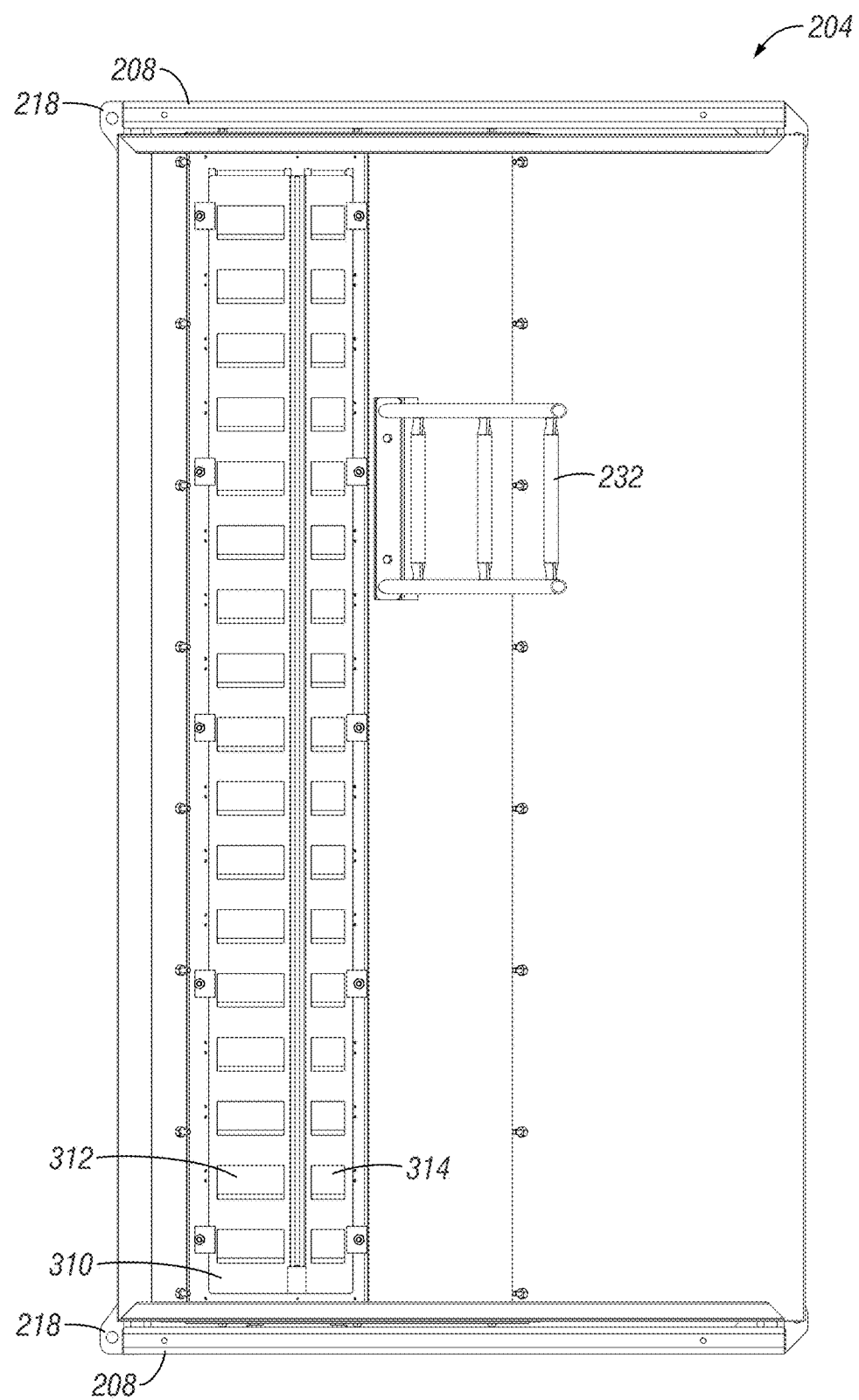
FIG. 6 is a cross-sectional view of the particulate container of FIG. 2 taken along section line 6-6.
Figure 7:
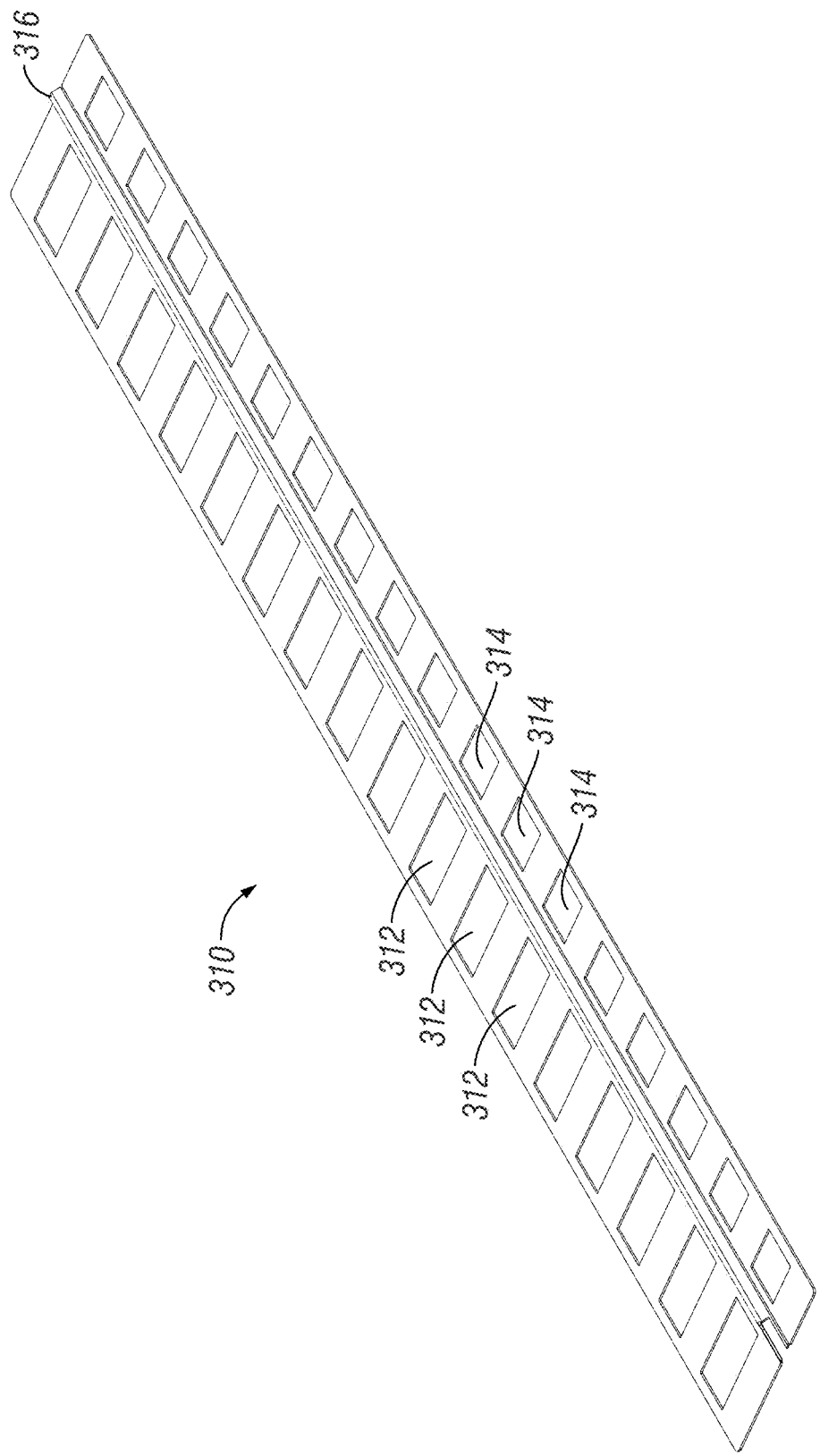
FIG. 7 is an isometric view of a bottom tray of a particulate container in accordance with an illustrative embodiment.

The particulate container 204 can include a bottom tray 310, as shown in FIGS. 5, 6 and 7. The bottom tray 310 can include a plurality of large gates 312 and a plurality of small gates 314 arranged along the length of the bottom tray 310. The plurality of gates 312 and 314 can be square and/or rectangular, as shown, or can be of any shape to permit particulate to enter the particulate delivery system 300. Similarly, the plurality of gates 312 and 314 can all be the same shape and/or size, or of varied shapes and/or sizes based on the application. The interstitial portions of the bottom tray 310 can be flat, as shown, or can have a wedged-shape configuration to funnel particulate to the plurality of gates 312 and 314. The bottom tray 310 can be integrally connected to the bottom portion 228 of the particulate container 204, or can be removable to permit a user to quickly install a different bottom tray 310 based on the application. As best shown in FIG. 7, the plurality of large gates 312 and the plurality of small gates 314 can be separated by a raised portion 316. The raised portion 316 can funnel the particulate into the plurality of large gates 312 and the plurality of small gates 314 and/or add structural support along the length of the bottom tray 310. Separating the particulate into pairs of gates (e.g., large gates 312 and small gates 314) can minimize undesirable torquing of the screw conveyors 356 (FIG. 10C) and auger motor(s) 504 (FIG. 18), particularly during initialization of the particulate handling system 300.

A plurality of movable and/or controllable gate covers (not shown) can be installed on plurality of gates 312 and 314. The gate covers, when closed, can prevent particulate from filling the short auger tubes and/or long auger tubes. The gate covers can be manually controlled or operatively controlled. The configuration can further increase the modularity of the particulate metering system by limiting which discharge points (e.g., row units), if any, receive one or more of the types of particulate.

Figure 8:
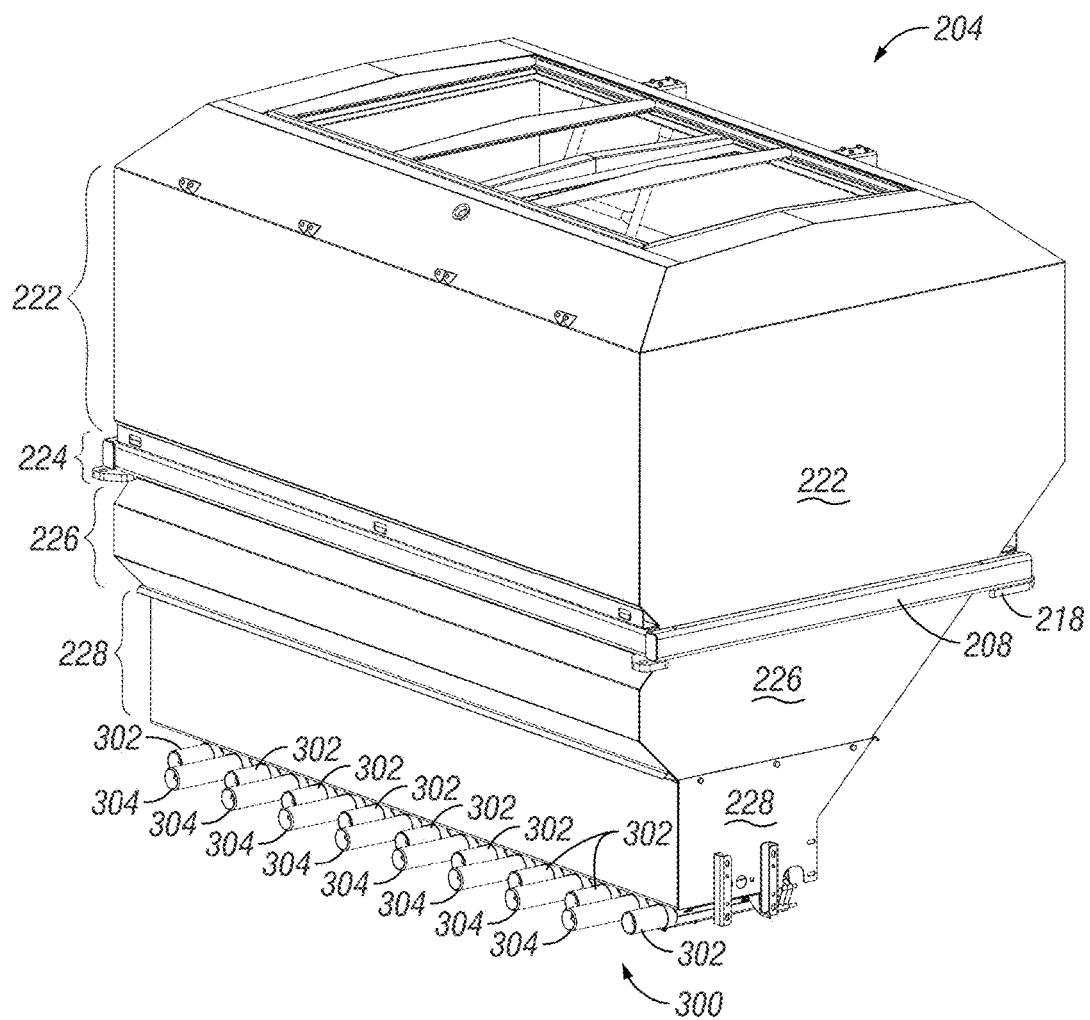
FIG. 8 is a front perspective view of a particulate container and a plurality of particulate handling systems in accordance with an illustrative embodiment.

Referring to FIG. 8, the particulate delivery system 300 can include a plurality of long auger tubes 304 and a plurality of short auger tubes 302. The plurality of long auger tubes 304 and the plurality of short auger tubes 302 can be alternately disposed in parallel below the bottom tray 310 (FIGS. 5 and 6) of the particulate container 204. The alternating of the long auger tubes 304 and the short auger tubes 302 can provide for a greater density of additional components disposed between particulate containers 202 and 204, and more particularly, a plurality of particulate accelerators, which will be discussed below. Each of the plurality of long auger tubes 304 and the plurality of short auger tubes 302 can extend from a cartridge 320 operatively connected to a gearbox 306, as shown illustratively in FIGS. 12, 14 and 16.

Figure 9:
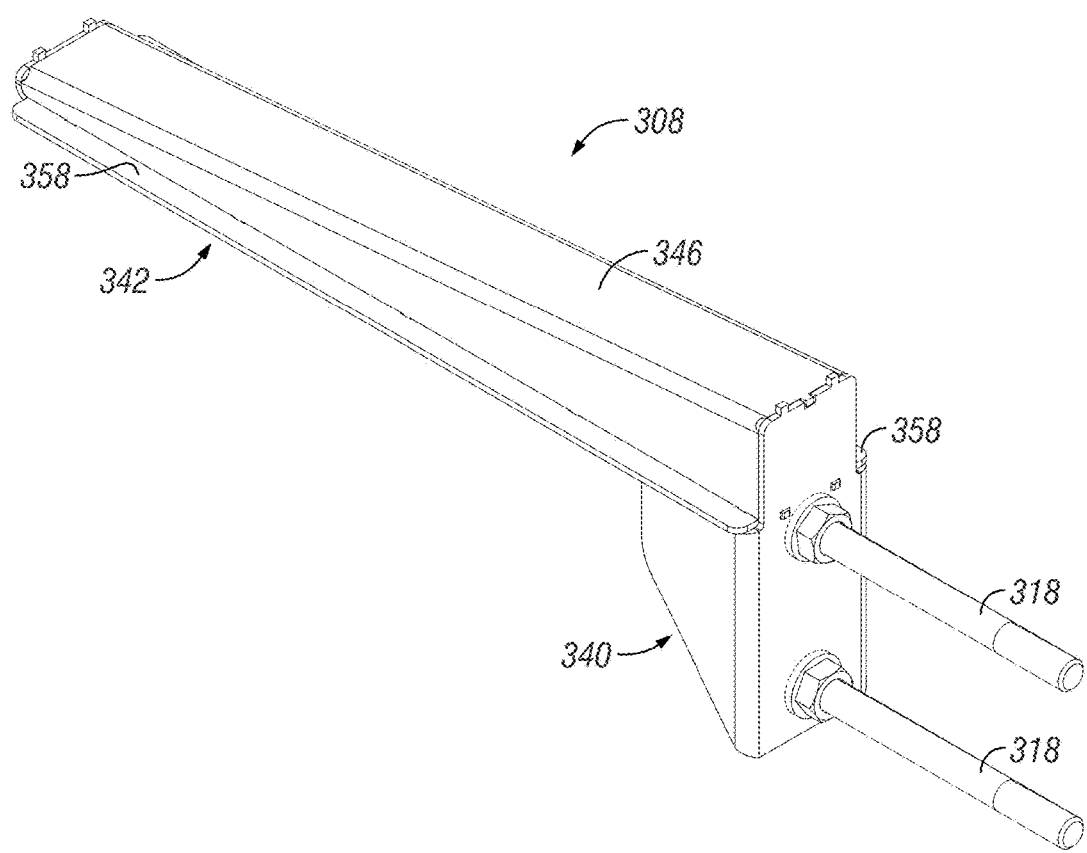
FIG. 9 is an isometric view of a hangar in accordance with an illustrative embodiment.
Figure 13:
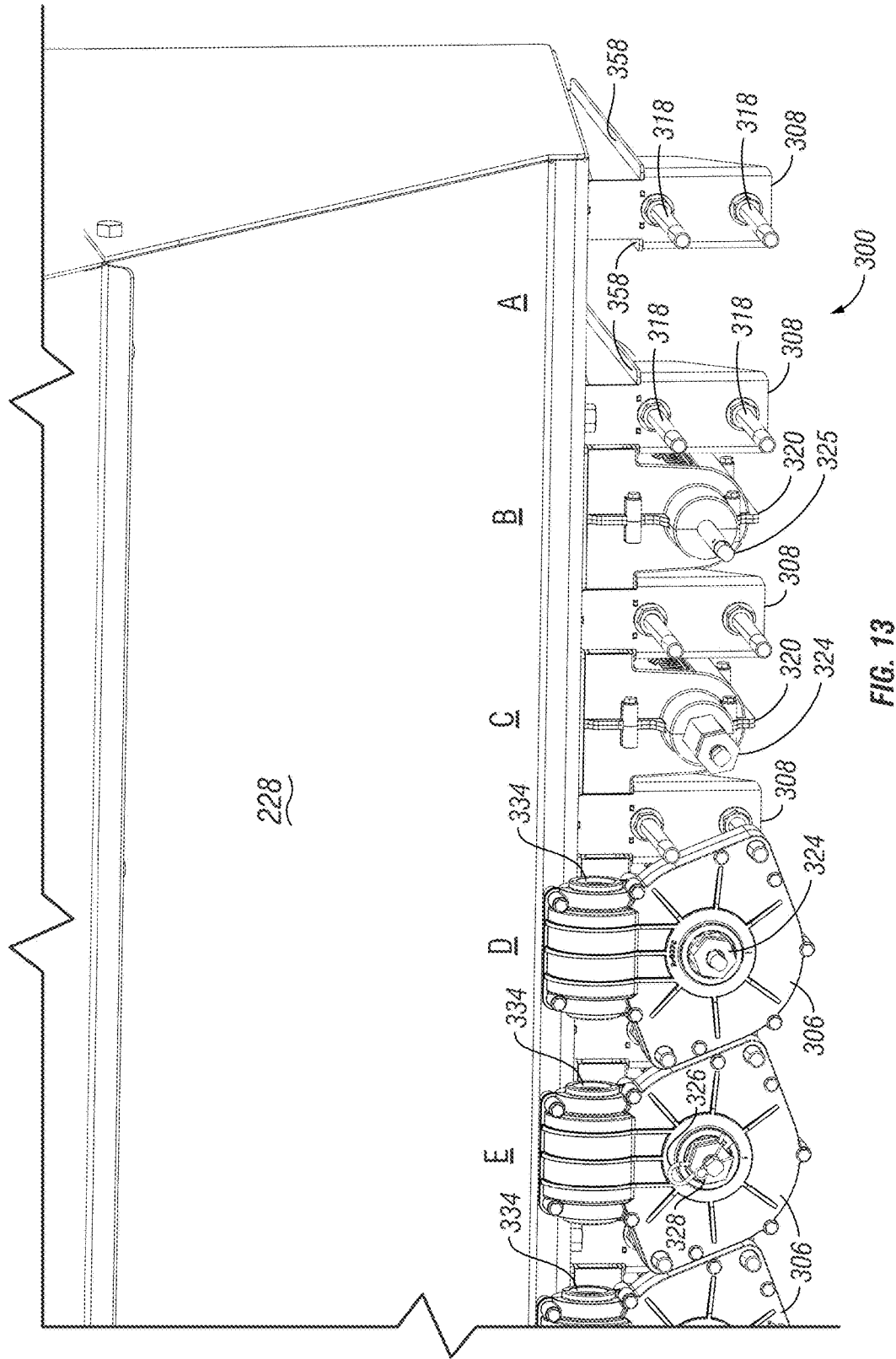
FIG. 13 is a front perspective view of the particulate handling system at various stages of installation in accordance with an illustrative embodiment.

As best shown in FIG. 13, each of the cartridges 320 can be disposed between two hangars 308 affixed to the lower portion 228 of the particulate container 204. The upper surface 346 of the hangars 308, as shown in FIG. 9, can be welded to the container, or may be affixed by any means commonly known in the art, including but not limited to, nut and bolt, screws, rivets, soldering, and the like. The upper surface 346 of the hangars 308 can comprise a portion of an elongated container attachment member 342. Extending outwardly from the container attachment member 342 can be two guide surfaces 358 generally parallel to the upper surface 346. As discussed below, a guide surface 358 from adjacent hangars 308 can be adapted to receive a cartridge 320. The hangars 308 can include a gearbox attachment member 340 extending perpendicularly downward from the container attachment member 342. The gearbox attachment member 340 can contain two prongs 318. The prongs 318 can be cylindrical or can be of any shape commonly known in the art to engage and/or secure a gearbox 306. Further, while two prongs 318 are shown in FIG. 9, the present disclosure contemplates any number of prongs without deviating from the objects of the disclosure.

In an another embodiment, the plurality of long auger tubes 304 and the plurality of short auger tubes 302 can be secured below the bottom tray 310 by a support member (not shown) extending the length of the particulate container 204.

The support member can be, for example, a generally U-shaped beam with a plurality of openings to support the cartridges.

Figure 10B:
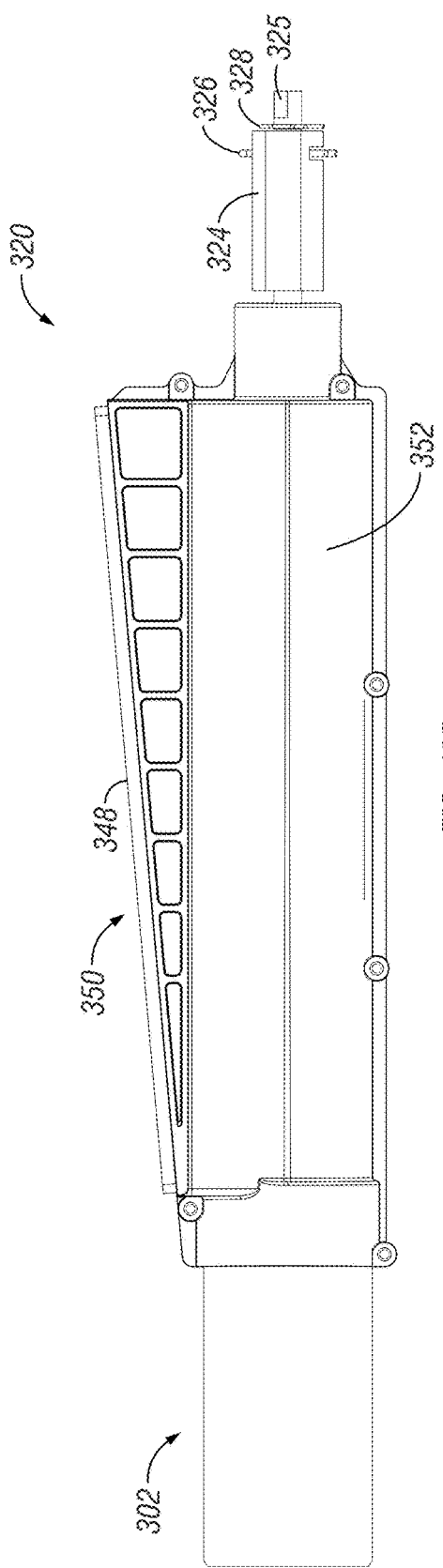
FIG. 10B is a side elevation view of a cartridge in accordance with an illustrative embodiment.
Figure 10C:
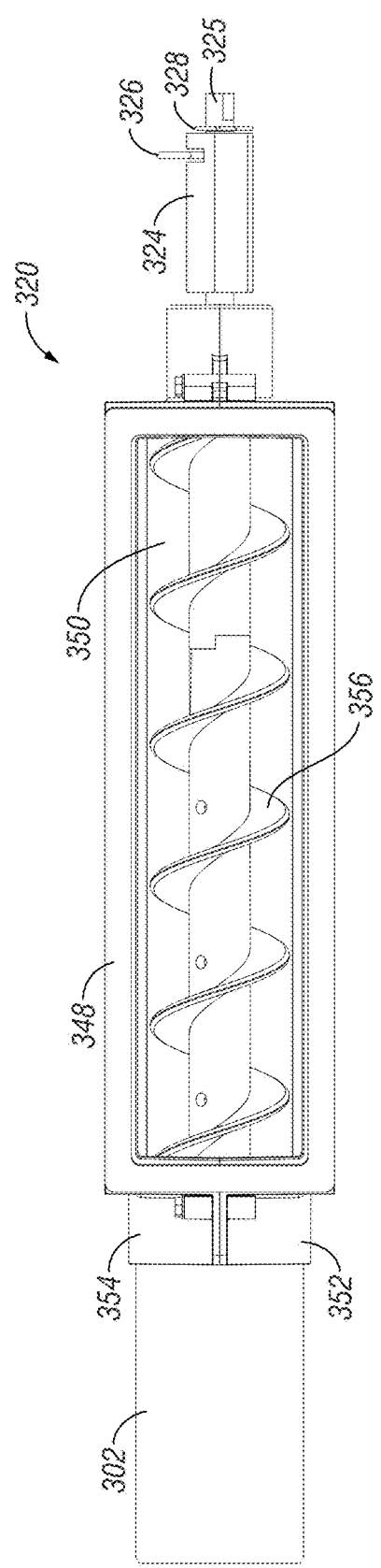
FIG. 10C is a top plan view of a cartridge in accordance with an illustrative embodiment.

An embodiment of the cartridge 320 is shown illustratively in FIGS. 10A, 10B and 10C. The cartridge 320 can include an input slot 350 sized and shaped to receive particulate passing through the plurality of large gates 312 and the plurality of small gates 314 in the bottom tray 310. An input slot interface 348 and a gasket (not shown) can seal the cartridge 320 to the inferior side of bottom tray 310. The seal can prevent particulate from escaping the system, particularly in instances where the particulate containers 202 and 204 are pressurized. The cartridge 320 can be constructed in two halves 352 and 354. While two halves can provide for ease of manufacturing, the present disclosure also contemplates a unitary cartridge construction.

Within the input slot 350 of the cartridge 320 is a screw conveyor 356. In an illustrative embodiment shown in FIG. 10C, the screw conveyor 356 can include a shaft and flightings as commonly known in the art. While the embodiment can utilize a screw conveyor, it can be appreciated by those skilled in the art that the disclosure covers other means of transmitting the material through a tube, including but not limited to, hydraulic pistons, pneumatics, slides, belts, and the like. External to the two halves 352 and 354 of the cartridge 320, the screw conveyor 356 can be coupled to an inner shaft 325. Encircling the inner shaft 325 can be a drive shaft 324. The inner shaft 325 and the drive shaft 324 can be rotatably engaged with a pin 326. The axial position of the drive shaft 324 on the inner shaft 325 can be preserved through a pin 328 extending through the inner shaft 325 proximate to an edge of the drive shaft 326. The drive shaft 324 can be hexagonal to engage a drive shaft opening 330 in the gearbox 306, as shown illustratively in FIGS. 11A and 11B. The drive shaft 326 may be hexagonal as shown, or may be of any shape suitable to engage the gearbox 306 and achieve the objects of the disclosure. Further, the present disclosure envisions the inner shaft 325 and the drive shaft 324 being a unitary construction.

Figure 11A:
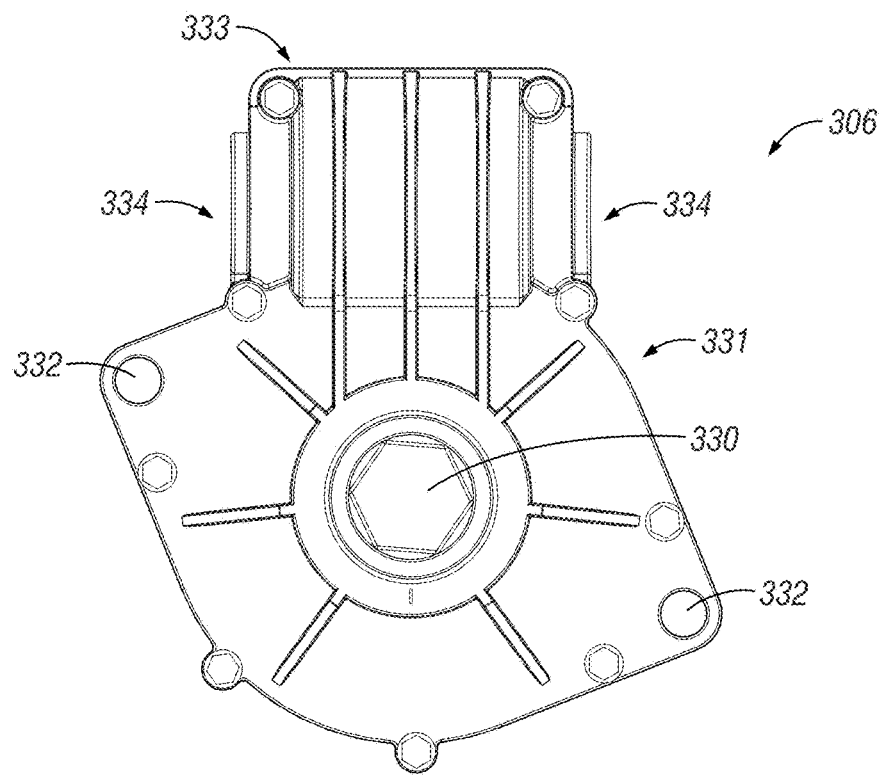
FIG. 11A is a front elevation view of a gearbox in accordance with an illustrative embodiment.
Figure 11B:
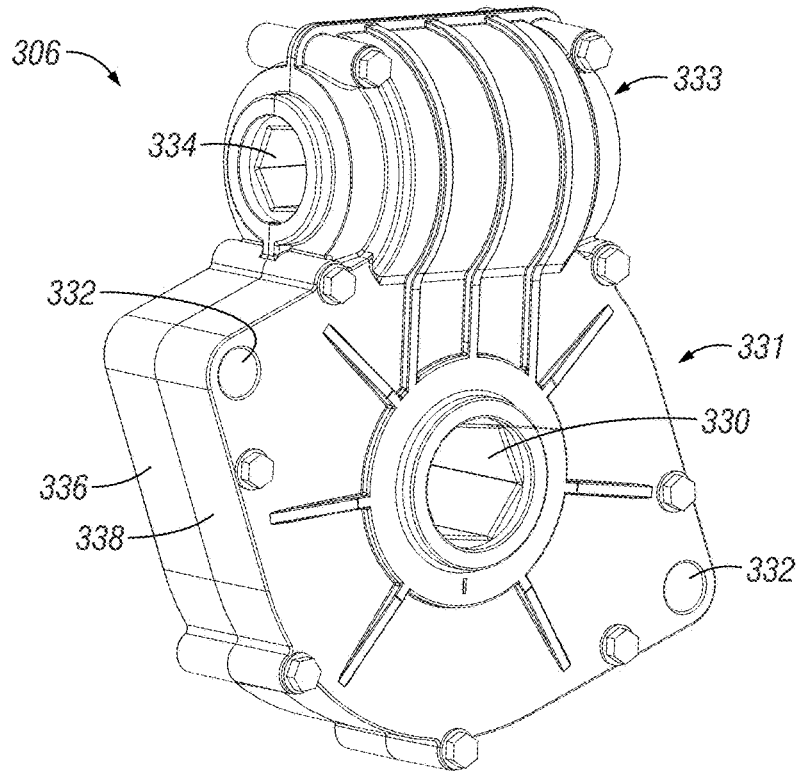
FIG. 11B is a front perspective view of a gearbox in accordance with an illustrative embodiment.
Figure 18:
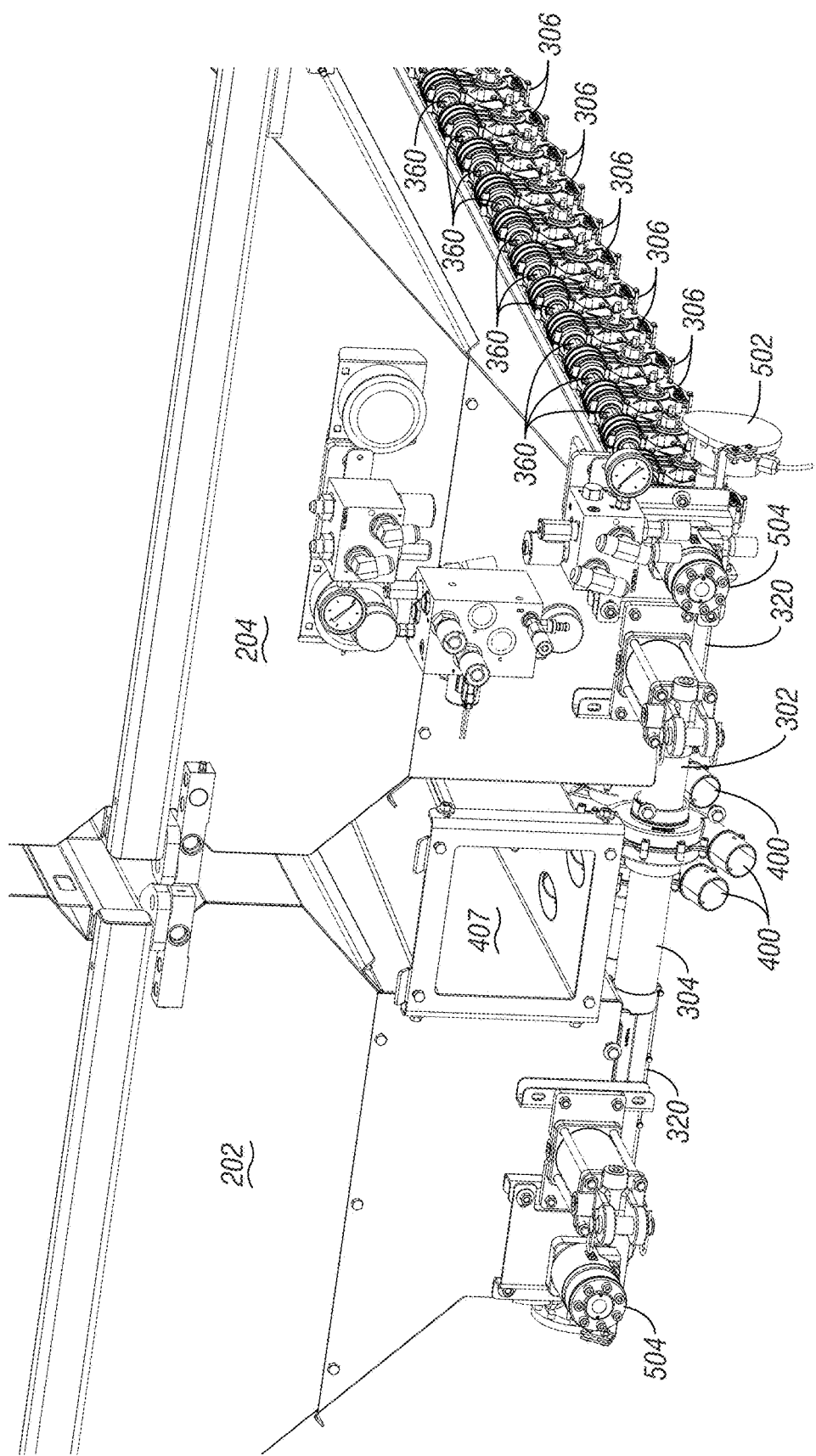
FIG. 18 is a front perspective view of a portion of a particulate container system in accordance with an illustrative embodiment.

A gearbox 306 is provided in FIGS. 11A and 11B. The gearbox 306 can be configured of two connectable halves 336 and 338 to provide for ease of manufacturing. The gearbox 306 can include an input portion 333 and an output portion 331. The input portion 333 can include a main shaft opening 334 extending through the input portion 333. The main shaft opening 334 can be adapted to receive and engage a main drive shaft 360 (FIG. 18). In the illustrative embodiment of FIGS. 11A and 11B, the main shaft opening 334 is hexagonal, but can be of any shape suitable to achieve the objects of the disclosure. As one or more gearboxes 306 can be connected in parallel, as discussed below, the main drive shaft 360 can span the length of the particulate container 204 and drive multiple gearboxes 306, as shown illustratively in FIG. 18. The output portion 331 can include a drive shaft opening 330 adapted to engage the drive shaft 324 of the cartridge 320, as discussed above. The drive shaft opening 330 can be orthogonal to main shaft opening 334, whereby each of the gearboxes 306 transfers the rotational speed and torque provided by the main drive shaft 360 to an associated screw conveyor 356 (FIG. 18) disposed within a cartridge 320. The gearbox 306 can be connected to the prongs 318 of hangars 308 through mounting holes 332 disposed on each side on the gearbox 306.

In another embodiment discussed in detail below, a motor can be operatively connected to each cartridge, thereby removing the need for gearboxes. In such an embodiment, the plurality of motors can be connected to the plurality of screw conveyors 356 to control each of the plurality of screw conveyors 356. Each of the plurality of motors can be operatively connected to a control system to produce a desired speed of each screw conveyor 356, of a group or bank of the screw conveyors 356, or of all the screw conveyors 356.

Figure 12:
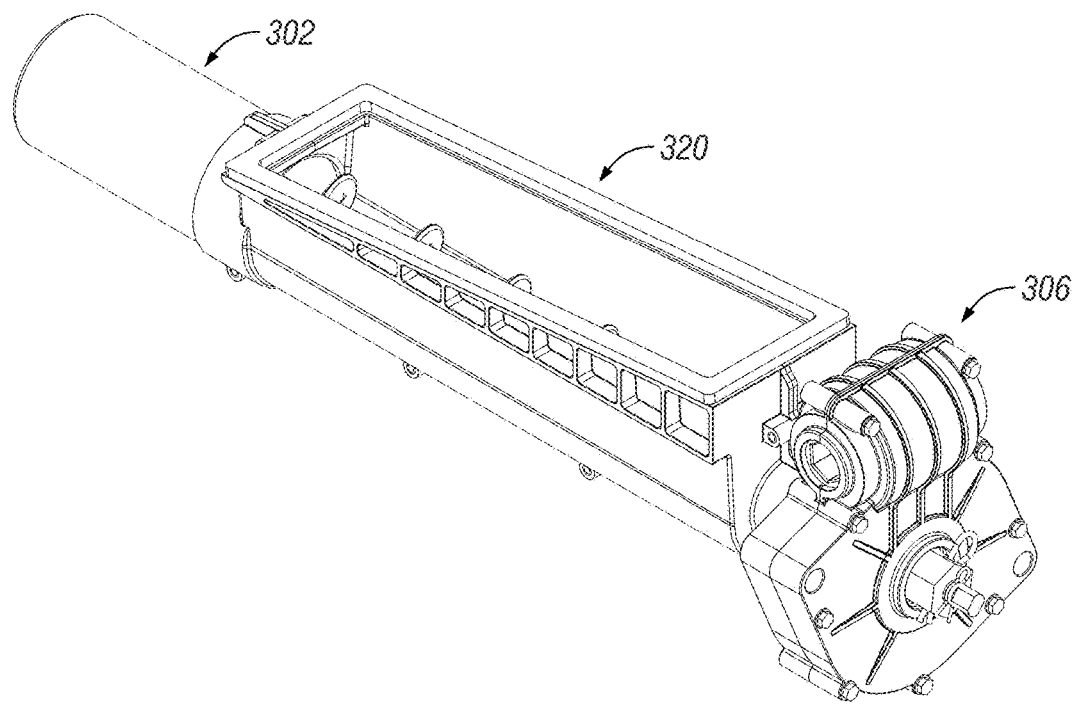
FIG. 12 is an isometric view of a particulate handling system in accordance with an illustrative embodiment.
Figure 14:
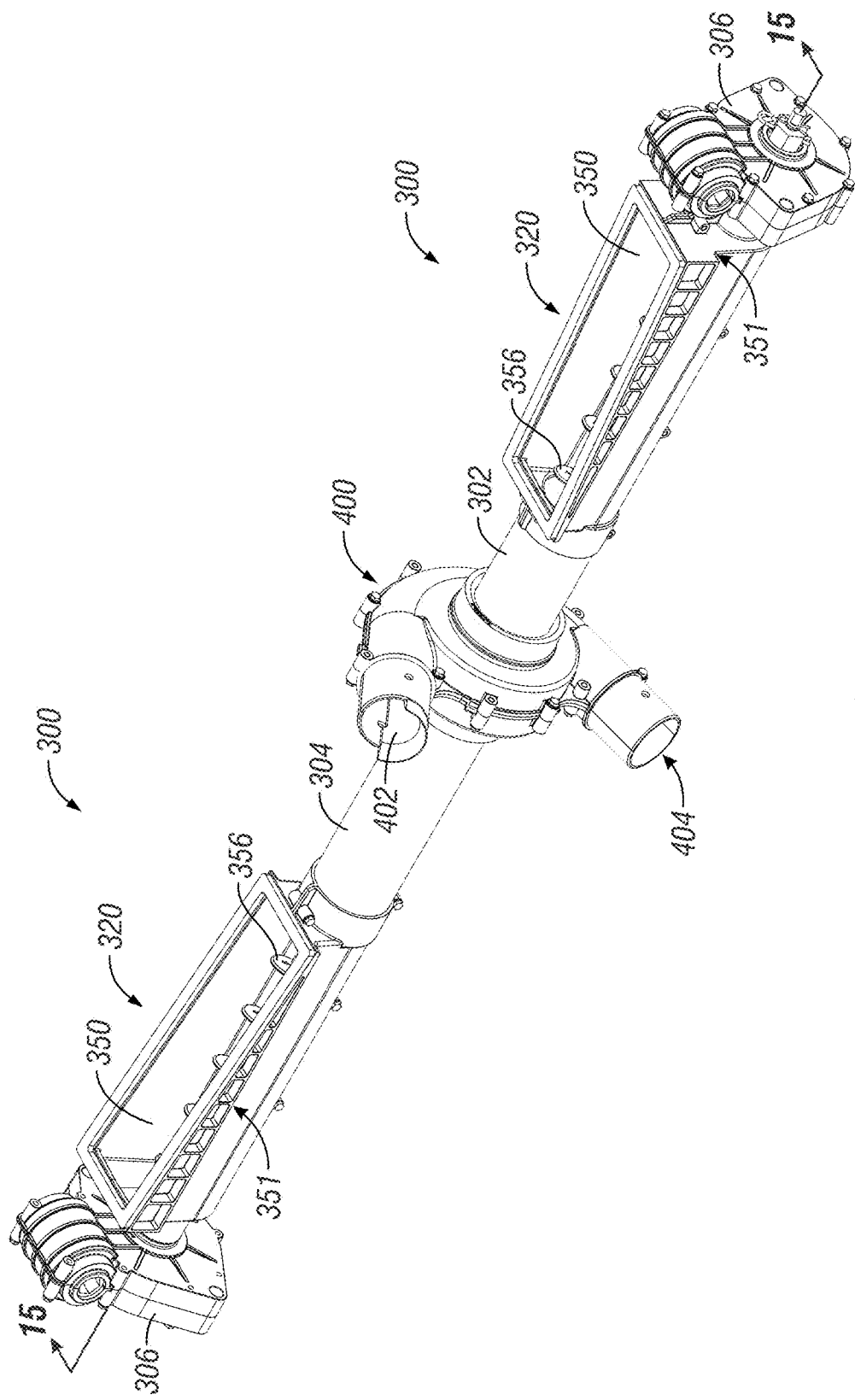
FIG. 14 is an isometric view of two particulate handling systems and a particulate accelerator in accordance with an illustrative embodiment.

Referring to FIGS. 12 and 14, a gearbox 306 can be connected to the cartridge 320. A long auger tube 304 or a short auger tube 302 can extend from the cartridge 320.

FIG. 13 illustrates a plurality of particulate handling systems 300 at various stages of installation. Beginning below so-called Sector A, two hangars 308 can be connected to the bottom surface of the particulate container 204, as discussed above. The hangars 308 may be parallel to one another and spaced to provide for installation of a cartridge 320. The cartridge 320 may be installed by sliding a lower surface 351 (FIG. 14) along guide surfaces 358, one from each of the adjacent hangars 308, as shown illustratively below Sector B. The advantageous design permits for ease of installation as well as removal and reinstallation should a cartridge 320 (and/or screw conveyor 356 (FIG. 14)) need to be repaired or replaced with the same or a different component. As illustrated below Sector C, the drive shaft 324 of the cartridge 320 can be installed over the inner shaft 325. The installation of the drive shaft 324 over the inner shaft 325 can occur either before or after the cartridge 320 has been installed between hangars 308. Thereafter, a gearbox 306 can be oriented such that the mounting holes 332 (FIG. 11B) are aligned with the prongs 318 on the hangars 308, as shown illustratively below Sector D. In such an orientation, the drive shaft opening 330 (FIG. 11B) can also be aligned with the drive shaft 324 of the cartridge 320. After installation of the gearbox 306 on the drive shaft 324, a pin 326 may be installed to rotatably engage inner shaft 325 and the drive shaft 324, and a pin 328 may be installed to axially secure the drive shaft 324 on the inner shaft 325, as shown illustratively below Sector E. Further, securing means commonly known in the art can be used to secure the gearbox 306 to the prongs 318. The installation process described above can be repeated for each row unit along the length of each of the particulate containers 202 and 204. The main drive shaft 360 (FIG. 18) can extend through and engage the main drive shaft openings 334 in each of the cartridges 320.

Each of the gearboxes 306 can have a clutch (not shown) in operable communication with a control system. At the direction of the user or based on instruction from the particulate metering system 100, the control system may engage/disengage one or more predetermined clutches in order to activate/deactivate the associated one or more screw conveyors.

As shown illustratively in FIG. 13, and more particularly below Sector D, each of the two prongs 318 of the one hangar 308 can be connected to adjacent gearboxes 306. In other words, an upper prong of a hangar can be connected to one gearbox while a lower prong of the same hangar can be connected to an adjacent gearbox. The arrangement is due to an advantageous design of the gearbox 306, which can permit one or more gearboxes 306 to be removed, inverted and reattached to the same two prongs as previously connected. The inversion of a gearbox 306 can provide several advantages over the state of the art. First, in an inverted position, one or more of the gearboxes 306 can be disengaged from the main drive shaft 360 based on the needs of the application (e.g., in at least one instance, where one or more of the rows in the field does not require particulate metering). Second, at least a second main drive shaft (not shown) can be implemented and adapted to engage the one or more gearboxes 306 placed in an inverted position. The second main drive shaft can also extend the length of the particulate container 204 and can be parallel to the main drive shaft 360. In such an embodiment, the user can invert one gearbox or can invert multiple gearboxes to permit desired groupings of the same (e.g., every four gearboxes, every other gearbox, etc.) based on the needs of the operation/application. Furthermore, together with the same opinion for the companion particulate handling system 300 associated with the second particulate container 202, the potential configurations can permit precise control over the blends of the particulate from the containers as well as application rates in which the blends are metered, features which are further discussed in detail below.

Figure 15:
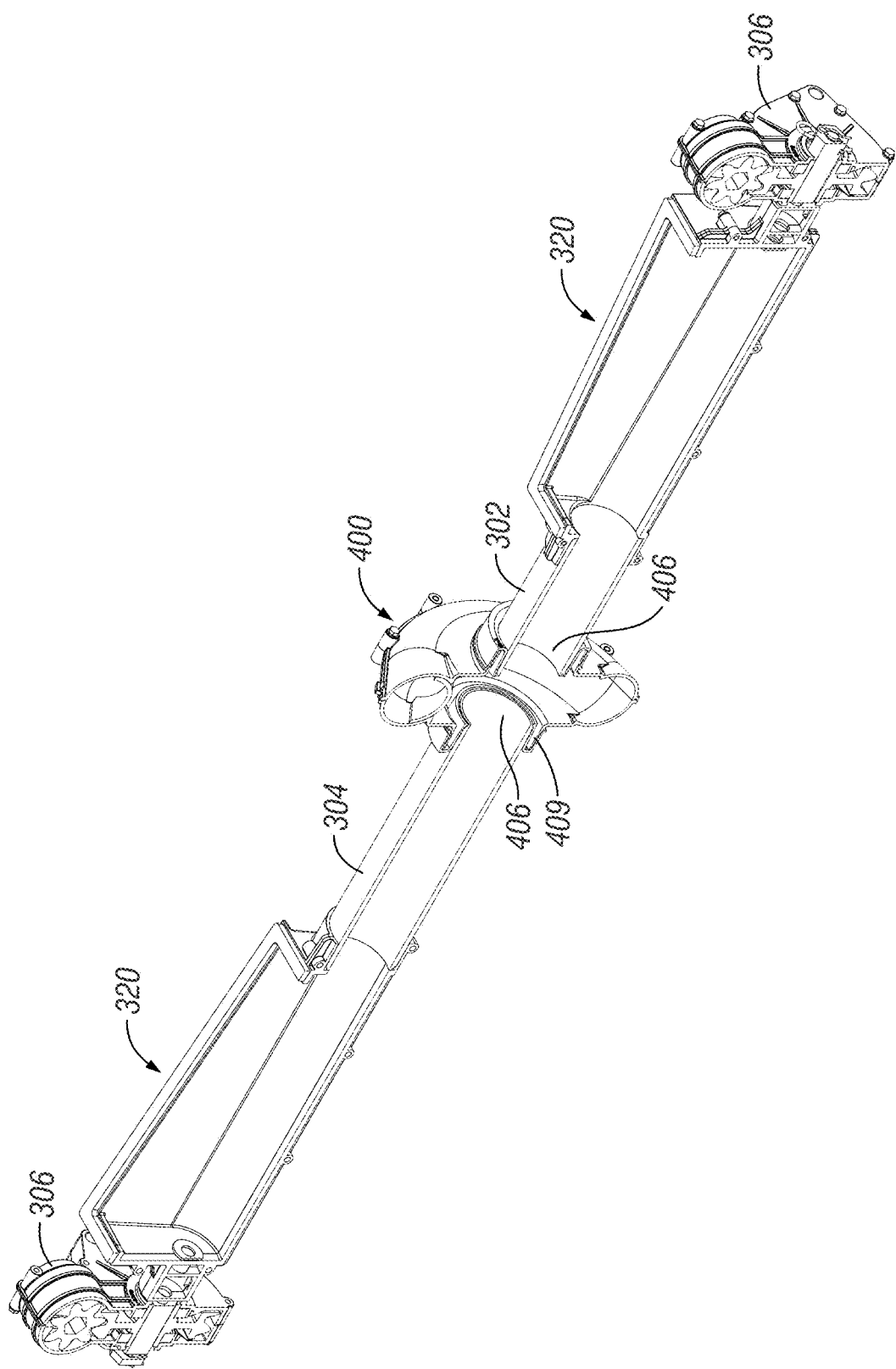
FIG. 15 is a cross-sectional view of the two particulate handling systems and a particulate accelerator of FIG. 14 taken along section line 15-15.

FIG. 14 illustrates companion particulate handling systems 300 connected to a particulate accelerator 400. In particular, the short auger tube 302 and long auger tube 304 extending from cartridges 320 can interface with a particulate accelerator 400 at interfaces 406. Referring to FIG. 15, a gasket 409 can seal the short auger tube 302 and the particulate accelerator 400 and long auger tube 304 and the particulate accelerator 400. The gasket 409 can provide the appropriate seal while accounting for the flexing required of the short auger tube 302 and long auger tube 304 within the particulate accelerators due to movement of the cartridges 320 (as the particulate containers 202 and 204 are emptied, experience vibration, and the like).

Figure 19:
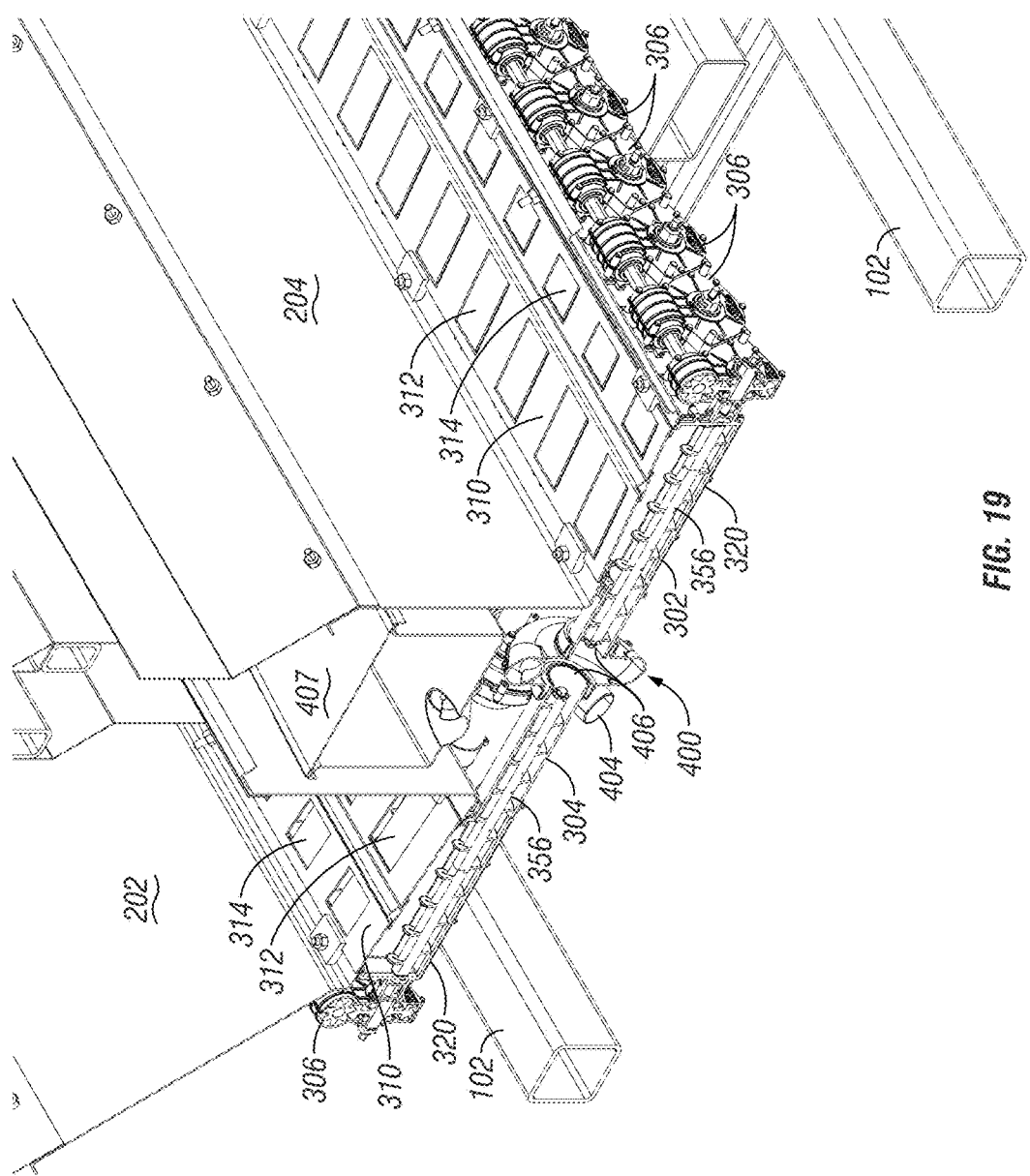
FIG. 19 is a front perspective view of a portion of a particulate container system in accordance with an illustrative embodiment.

In operation, particulate within the particulate container 204 can pass through the plurality of large gates 312 and a plurality of small gates 314 of the bottom tray 310 and the input slots 350 of a short auger tube 302 and the long auger tube 304, as shown illustratively in FIGS. 14 and 19. Referring to FIGS. 10A and 18, the main drive shaft 360 can be rotatably connected to a drive shaft 324 by the gearbox 306. Upon receiving an input force from the auger motor 504 via the gearbox 306, the drive shaft 324 rotates the screw conveyor 356. The flightings of the screw conveyor 356 can transmit the particulate contained within the short auger tube 302 and the longer auger tube 304 towards interfaces 406, as shown illustratively in FIGS. 14 and 15. The speed at which the screw conveyor 356 rotates can be measured by a speed sensor 502 (FIG. 18). The process described above can also occur for each pair of the particulate handling systems along the length of the particulate containers. As discussed in detail herein, the auger motor associated with a subset of particulate handling systems of one particulate container can be independently controlled from the auger motor associated with a separate subset of particulate handling systems of a separate particulate container, thereby providing for variable blend of the types of particulate. Together with inversion of one or more gearboxes and/or auger motors operatively connected to one or more screw conveyors, a user can have precise control over the blend of the types of particulate and the application rate at which the blend is metered into the particulate accelerators.

Referring to FIGS. 14-17, the particulate accelerator 400 can include an inlet 402 and an outlet 404. The inlet 402 can be in fluid connection with one of a plurality of output tubes 408 disposed on the bottom wall 418 of a plenum 407. Further, the outlet tubes 408 can be arranged in two rows along the length of the plenum 407. The two rows of outlet tubes 408 along the length of the plenum 407 can be staggered longitudinally, as shown illustratively in FIG. 16, to maximize compactness of the particulate accelerators 400 disposed below the plenum and/or to impart desired airflow characteristics. Still further, the outlet tubes 408 can be cylindrical in shape; however, the present disclosure envisions other arrangements and/or shapes of the outlet tubes 408 without detracting from the objects of the disclosure. For example, the outlet tubes 408 may be cylindrical in shape, but the disclosure envisions different shapes, including oval, ellipsoid, rectangular, square, and the like. The outlet tubes 408 can be arranged in one row along the length of the plenum 407, or arranged on multiple surfaces, including on the side wall 412 and/or the cover 416.

Figure 16:
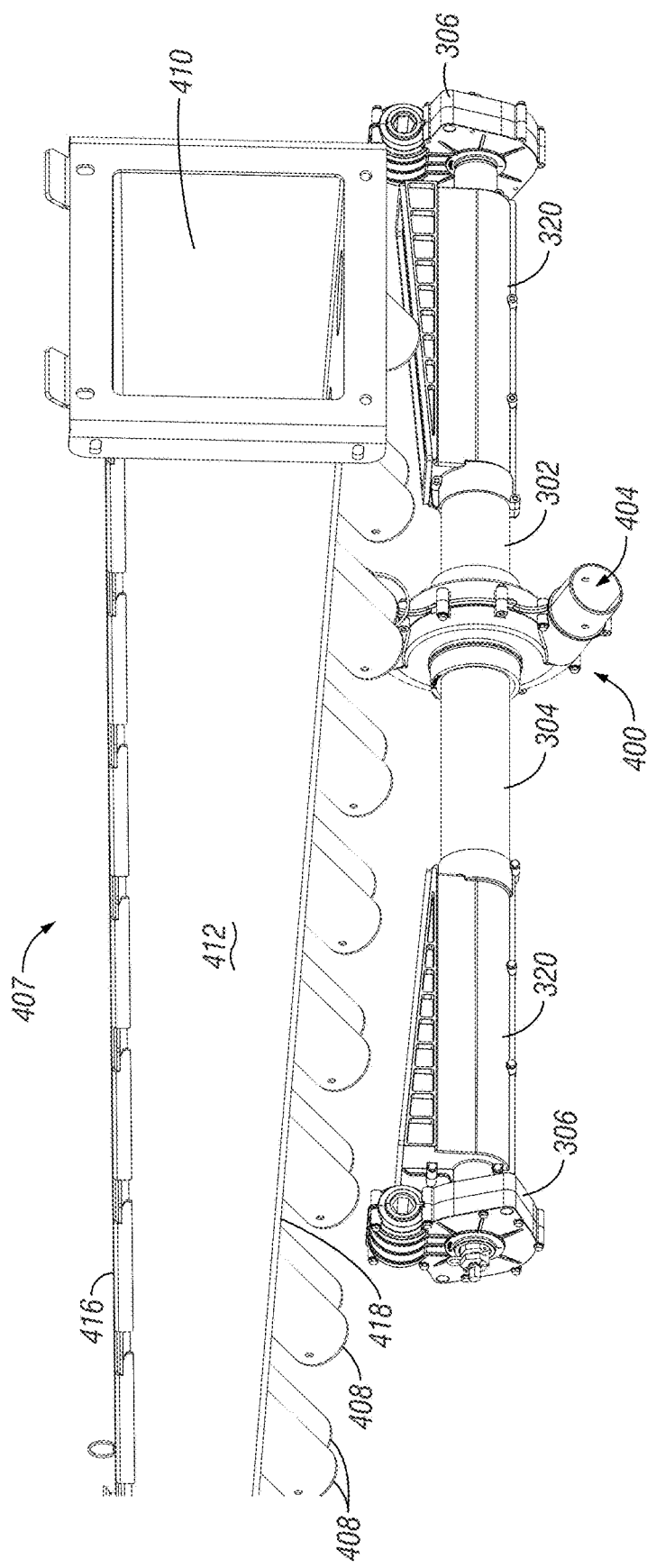
FIG. 16 is a front perspective view of two particulate handling systems, a particulate accelerator, and a plenum in accordance with an illustrative embodiment.
Figure 17:
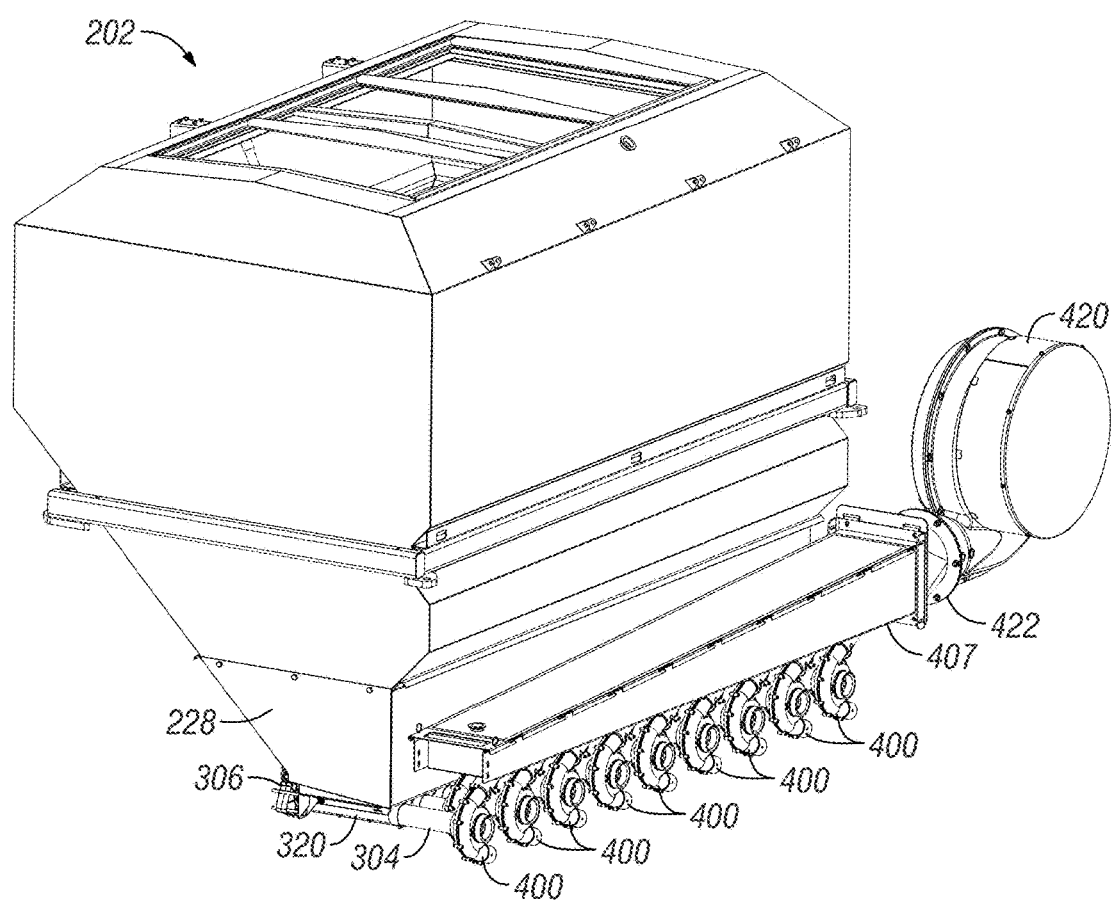
FIG. 17 is a front perspective view of a portion of a particulate container system in accordance with an illustrative embodiment.

The plenum 407 has an intake 410 that is in fluid communication with a blower 420, as shown illustratively in FIGS. 16 and 17, and can be connected via a blower coupler 422. The plenum 407 and/or blower coupler 422 can be made of steel, but the disclosure contemplates other materials such as aluminum, polymers, composites, ceramics, and the like. The side wall 412 of the plenum 407 can be trapezoidal in shape or another like geometry. In other words, at the edge proximate to the intake 410, the height of the side wall 412 is greater than the height of the same distal to the intake 410. The tapering of the plenum 407 can maintain the appropriate pressure and airflow characteristics along its length as air exits the plenum 407 through the outlet tubes 408. Further, the plurality of outlet tubes 408 can be oriented to impart the appropriate flow characteristics as air transitions from the plenum 407 to the particulate accelerators 400.

After passing through the plenum 407 and outlet tubes 408, air generated by the blower 420 can enter the particulate accelerators 400. Further, as discussed above, the screw conveyors 356 can transmit the particulate contained within the short auger tube 302 and the longer auger tube 304 towards interfaces 406. Upon reaching the interfaces 406, the particulate blend can descend vertically within the particulate accelerators 400 due to the force of gravity. The air can provide a fluid bed of air upon which the particulate blend is suspended as it exits particulate accelerator 400 through outlet 404. The particulate blend can then enter a hose (not shown) and be metered to a discharge point in any manner commonly known in the art. The process described above can occur simultaneously in each particulate accelerator 400 disposed along the length of the plenum 407.

The present disclosure permits extraordinary control over the blend of particulate (i.e., the mixture ratio of the types of particulate from each particulate container) for each row unit and the rates in which the blends are metered to each row unit. Regarding the variable blend of particulate, an embodiment of the disclosure provides a plurality of the screw conveyors associated with one of the particulate containers wherein the screw conveyors feed particulate to the particulate accelerator at a different rate than a plurality of the screw conveyors associated with another particulate container. In this embodiment, the blend of particulate can be adjustable but constant across the plurality of row units to be metered. The addition of clutches on one or more of the gearboxes operatively connected to a control system, as discussed above, provides for independent control of one or more sections of the particulate handling subsystems when predetermined clutches disengage the associated screw conveyors.

Further, an embodiment of the disclosure provides inverting one or more of the gearboxes to engage a second main drive shaft. The same can occur with one or more gearboxes associated with the companion particulate container. In such a representative example, four auger motors can be operatively connected to four main drive shafts. The rotational speed of the four auger motors can be independently controlled. The user can select which gearboxes are operatively connected to the second main drive shaft from each of the companion particulate containers, resulting in numerous blend combinations. Further, the independent control of the four auger motors provides for numerous combinations of the application rate in which the blend is fed into the particulate accelerators. Subject to the initial gearbox orientation on the main drive shafts, the speed of the auger motors can be adjusted prior to and/or during operation to accommodate the real-time demands of the application.

While the representative example above provides for four auger motors, the disclosure contemplates any number of auger motors and main drive shafts consistent with the objects of the disclosure. For example, two auger motors and two main drive shafts can be connected to a front of a particulate container to operate two separate subsets of the gearboxes proximate to the front of the container, and two auger motors and two main drive shafts can be connected to a rear of a particulate container to operate two separate subsets of the gearboxes proximate to the rear of the container. The same configuration can be achieved for the other particulate container. In such an arrangement, the particulate metering system can have eight auger motors and eight drive shafts. Within the separate subsets of the gearboxes, a user can select specific gearboxes to invert to engage the second main drive shaft, resulting in even greater variable blend combinations. Further, the independent control of the eight auger motors can provide for even greater combinations of the application rate in which the blend is metered to the particulate accelerators. Still further, subject to the initial gearbox orientation on the main drive shafts, the speed of the auger motors can be adjusted prior to and/or during operation to accommodate the real-time demands of the application.

Moreover, a motor can be operatively connected to each screw conveyor, thereby removing the need for main drive shafts and gearboxes. In such an embodiment, each screw conveyor can be independently controlled by the motor operatively connected to a control system to produce a desired speed of each screw conveyor, of a group or bank of the screw conveyors, or of all the screw conveyors. The configuration can further provide variable blend and variable rate control for each discharge point, such as at a row unit. Further, the configuration can also perform single-row, real-time adjustments during operation of the particulate metering system to accommodate the demands of the operation/application.

The disclosure is not to be limited to the particular embodiments described herein. In particular, the disclosure contemplates numerous variations in the type of ways in which embodiments of the disclosure can be applied to metering systems with variable blend and variable application rate controls for particulate matter. The foregoing description has been presented for purposes of illustration and description. It is not intended to be an exhaustive list or limit any of the disclosure to the precise forms disclosed. It is contemplated that other alternatives or exemplary aspects that are considered included in the disclosure. The description is merely examples of embodiments, processes or methods of the disclosure. It is understood that any other modifications, substitutions, and/or additions can be made, which are within the intended spirit and scope of the disclosure. For the foregoing, it can be seen that the disclosure accomplishes at least all that is intended.

The previous detailed description is of a small number of embodiments for implementing the disclosure and is not intended to be limiting in scope. The following claims set forth a number of the embodiments of the disclosure with greater particularity.

What is claimed is:

1. A particulate metering system with variable discharge control, comprising:
a flow path having:
a. an inlet in communication with one or more intake points configured to receive particulate from particulate storage containers;
b. an outlet in communication with two or more discharge points configured to dispense particulate from particulate accelerators;
a plurality of particulate storage containers, each of the plurality of particulate storage containers having different types of particulate;
a plurality of separate particulate accelerators within the flow path, each of the plurality of separate particulate accelerators having a mixture ratio of particulate;
one or more metering controls in operable control of metering the different types of particulate into the plurality of separate particulate accelerators for controlling a variation of the mixture ratio; and
wherein the mixture ratio is unequally distributed across the two or more discharge points of the flow path.

2. The particulate metering system of claim 1, further comprising:
a plurality of operated particulate conveyors in communication with the plurality of particulate storage containers and the plurality of separate particulate accelerators, each of the plurality of operated particulate conveyors having a separate discharge.

3. The particulate metering system of claim 2, further comprising:
a plurality of conveyance speeds, each of the plurality of conveyance speeds associated with at least one of the plurality of operated particulate conveyors.

4. The particulate metering system of claim 2 wherein each of the plurality of separate particulate accelerators is associated with more than one of the plurality of operated particulate conveyors.

5. The particulate metering system of claim 1 wherein each of the plurality of separate particulate accelerators receives the different types of particulate from the particulate storage containers.

6. The particulate metering system of claim 1 wherein each of the plurality of separate particulate accelerators is in communication with one of the one or more intake points and one of the one or more discharge points.

7. The particulate metering system of claim 1, further comprising:
a first set of operated particulate conveyors; and
a second set of operated particulate conveyors comprising a subset of the first set of operated particulate conveyors;
wherein a conveyance rate of the first set of operated particulate conveyors and a conveyance rate of the second set of the operated particulate conveyors are associated with the same one of the plurality of particulate storage containers,
wherein the conveyance rate of the first set of operated particulate conveyors and the conveyance rate of the second set of operated particulate conveyors are selectively controllable.

8. A particulate metering system with variable discharge control, comprising:
a plurality of particulate accelerators, each of the plurality of particulate accelerators having:
a) an air input; and
b) a plurality of particulate inputs;
a plurality of particulate sources, each of the plurality of particulate sources in communication with one of the plurality of particulate inputs of each of the plurality of particulate accelerators;
a separate type of particulate in each of the plurality of particulate sources; and
a plurality of operated particulate conveyors, each of the plurality of operated particulate conveyors in communication with at least one of the plurality of particulate sources and one of the plurality of particulate inputs;
a first subset of the plurality of particulate accelerators;
a first particulate blend distributed across the first subset of the plurality of particulate accelerators;
a second subset of the plurality of particulate accelerators; and
a second particulate blend distributed across the second subset of the plurality of particulate accelerators,
wherein the first particulate blend and the second particulate blend contain different metered proportions of particulate; and
wherein each of the plurality of particulate accelerators receives air from the air input, receives a separate type of particulate, and discharges an air-particulate mixture.

9. The particulate metering system of claim 8, further comprising:
a particulate blend of the plurality of types of particulate;
wherein the particulate blend is varied across the plurality of particulate accelerators.

10. The particulate metering system of claim 9, further comprising:
one or more metering controls in operable control of the plurality of operated particulate conveyors, wherein the one or more metering controls control the particulate blend within each of plurality of particulate accelerators.

11. The particulate metering system of claim 8 wherein each of the plurality of particulate accelerators receives the air from a common air source.

12. The particulate metering system of claim 8, further comprising:
a rate of operation of each of the plurality of operated particulate conveyors,
wherein the rate of operation is selectively controllable.

13. A method for metering particulate, the method comprising the steps of:
providing a plurality of types of particulate, a plurality of particulate sources, a plurality of particulate accelerators, and a plurality of operated particulate conveyors associated with each of the plurality of particulate accelerators;
conveying each of the plurality of the types of particulate from the plurality of particulate sources to the plurality of operated particulate conveyors;
guiding each of the plurality of types of particulate from the plurality of operated particulate conveyors to the plurality of particulate accelerators;
controlling a particulate blend of the plurality of types of particulate across each of the plurality of particulate accelerators;
providing a flow of air through an inlet on each the plurality of accelerators;

discharging the particulate blend through an outlet on each the plurality of accelerators; and independently controlling a conveyance rate of each of the plurality of operated particulate conveyors associated with each of the plurality of particulate accelerators.

14. The method of claim 13, further comprising the step of:

providing the flow of air to the inlet on each the plurality of accelerators from a common air source.

15. A particulate metering system with variable discharge control, comprising:

a flow path having:
 a. an inlet in communication with one or more intake points configured to receive particulate from particulate storage containers;
 b. an outlet in communication with two or more discharge points configured to dispense particulate from particulate accelerators;

a plurality of particulate storage containers, each of the plurality of particulate storage containers having different types of particulate;

a plurality of separate particulate accelerators within the flow path, each of the plurality of separate particulate accelerators having a mixture ratio of particulate;

one or more metering controls in operable control of metering the different types of particulate into the plurality of separate particulate accelerators for controlling a variation of the mixture ratio; and a plurality of operated particulate conveyors in communication with one of the plurality of separate particulate mixing accelerators;

wherein each of the plurality of operated particulate conveyors is in communication with one of the plurality of particulate storage containers and conveys one of the different types of particulate to the one of the plurality of separate particulate mixing accelerators;

wherein two or more of the plurality of operated particulate conveyors operate at a different rate.

16. A particulate metering system with variable discharge control, comprising:

a plurality of particulate accelerators, each of the plurality of particulate accelerators having:
 a) an air input; and
 b) a plurality of particulate inputs;

a plurality of particulate sources, each of the plurality of particulate sources in communication with one of the plurality of particulate inputs of each of the plurality of particulate accelerators;

a separate type of particulate in each of the plurality of particulate sources; and a plurality of operated particulate conveyors, each of the plurality of operated particulate conveyors in communication with at least one of the plurality of particulate sources and one of the plurality of particulate inputs;

wherein each of the plurality of particulate accelerators receives air from the air input, receives a separate type of particulate, and discharges an air-particulate mixture;

wherein two or more of the plurality of operated particulate conveyors is in communication with one of the plurality of particulate accelerators.

17. A method for metering particulate, the method comprising the steps of:

providing a plurality of types of particulate, a plurality of particulate sources, a plurality of particulate accelerators, and a plurality of operated particulate conveyors associated with each of the plurality of particulate accelerators;

conveying each of the plurality of the types of particulate from the plurality of particulate sources to the plurality of operated particulate conveyors;

guiding each of the plurality of types of particulate from the plurality of operated particulate conveyors to the plurality of particulate accelerators;

controlling a particulate blend of the plurality of types of particulate across each of the plurality of particulate accelerators;

providing a flow of air through an inlet on each the plurality of accelerators;

discharging the particulate blend through an outlet on each the plurality of accelerators;

controlling a conveyance rate of a first subset of the plurality of operated particulate conveyors; and controlling a conveyance rate of a second subset of the plurality of operated particulate conveyors independent from the first subset of the plurality of operated particulate conveyors.

* * * * *